US009100667B2

(12) United States Patent
Moore et al.

(10) Patent No.: US 9,100,667 B2
(45) Date of Patent: Aug. 4, 2015

(54) LIFE STREAMING

(75) Inventors: Richard Moore, Redmond, WA (US); Avi Bar-Zeev, Redmond, WA (US); Alex Aben-Athar Kipman, Redmond, WA (US); Andrew John Fuller, Redmond, WA (US); Rudy Jacobus Poot, Clyde Hill, WA (US); Kathryn Stone Perez, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 652 days.

(21) Appl. No.: 13/031,033

(22) Filed: Feb. 18, 2011

(65) Prior Publication Data
US 2012/0213212 A1    Aug. 23, 2012

(51) Int. Cl.
H04N 9/80       (2006.01)
H04N 21/2187    (2011.01)
(Continued)

(52) U.S. Cl.
CPC ............ *H04N 21/2187* (2013.01); *H04N 5/77* (2013.01); *H04N 21/2743* (2013.01); *H04N 21/4223* (2013.01); *H04N 21/42203* (2013.01);
(Continued)

(58) Field of Classification Search
CPC .............. H04N 7/181; H04N 21/2187; H04N 21/4334; H04N 7/17318; H04N 21/26208; H04N 21/4147; H04N 21/4223; H04N 21/44008; H04N 21/47214; H04N 21/84; H04N 21/23106; H04N 21/25891; H04N 21/26603; H04N 21/2668; H04N 21/4622; H04N 7/18
USPC .......... 370/338; 386/240, 461, 200, 224, 239, 386/241, 248, E05.002, E07.018; 382/118
See application file for complete search history.

(56) References Cited

U.S. PATENT DOCUMENTS

2006/0174297 A1* 8/2006 Anderson et al. ............. 725/100
2009/0013263 A1* 1/2009 Fortnow et al. ............... 715/753
(Continued)

OTHER PUBLICATIONS

Arrington, Michael. "Life Recorders May Be This Century's Wrist Watch." TechCrunch [online]. Sep. 6, 2009. Retrieved from the Internet on Oct. 21, 2010: URL: <http://techcrunch.com/2009/09/06/life-recorders-may-be-this-centurys-wrist-watch/>. Three pages.
(Continued)

*Primary Examiner* — Melanie Jagannathan
*Assistant Examiner* — Najeebuddin Ansari
(74) *Attorney, Agent, or Firm* — Micah Goldsmith; Judy Yee; Micky Minhas

(57) ABSTRACT

A system and method for analyzing, summarizing, and transmitting life experiences captured using a life recorder is described. A life recorder is a recording device that continuously captures life experiences, including unanticipated life experiences, in video and/or audio recordings. In some embodiments, the video and/or audio recordings generated by a life recorder are automatically summarized, indexed, and stored for future use. By indexing and storing life recordings, a life recorder may search for and acquire life recordings generated by itself or another life recorder, thereby allowing life experiences to be shared minutes or even years later. In some embodiments, recordings generated by a life recorder may be analyzed in real-time and automatically pushed to one or more target devices. The ability to automatically and instantaneously push life recordings as live feeds to one or more target devices allows friends and family to experience one's life experience in real-time.

11 Claims, 16 Drawing Sheets

(51) Int. Cl.
*H04N 5/77* (2006.01)
*H04N 21/2743* (2011.01)
*H04N 21/422* (2011.01)
*H04N 21/4223* (2011.01)
*H04N 21/433* (2011.01)
*H04N 21/4788* (2011.01)
*H04N 9/82* (2006.01)

(52) U.S. Cl.
CPC ....... *H04N21/4334* (2013.01); *H04N 21/4788* (2013.01); *H04N 9/8227* (2013.01)

(56) References Cited

U.S. PATENT DOCUMENTS

| | | | | |
|---|---|---|---|---|
| 2009/0148124 | A1* | 6/2009 | Athsani et al. | 386/46 |
| 2009/0171902 | A1* | 7/2009 | MacLaurin et al. | 707/3 |
| 2009/0175510 | A1* | 7/2009 | Grim et al. | 382/118 |
| 2009/0175599 | A1* | 7/2009 | Grim et al. | 386/124 |
| 2009/0177679 | A1* | 7/2009 | Boomer et al. | 707/102 |
| 2009/0216435 | A1 | 8/2009 | Zheng et al. | |
| 2009/0327885 | A1* | 12/2009 | Aoki et al. | 715/700 |

OTHER PUBLICATIONS

Genuth, Iddo. "Saving Your Life on a Hard Drive." TFOT: The Future of Things [online]. Jun. 19, 2006. Retrieved from the Internet on Oct. 21, 2010: URL: <http://thefutureofthings.com/articles.php?itemId=16/>. Three pages.

Hanlon, Mike. "Momenta neck-work PC—another Black Box Life Recorder." Gizmag [online]. Apr. 6, 2008. Retrieved from the Internet on Oct. 21, 2010: URL: <http://www.gizmag.com/momenta-neck-worn-pc-another-black-box-life-recorder/9113/>. Four pages.

Humphries, Matthew. "Sony developing eye-tracking, lifelogging glasses." Geek.com [online]. Jun. 7, 2010. Retrieved from the Internet on Oct. 21, 2010: URL: <http://www.geek.com/articles/gadgets/sony-developing-eye-tracking-lifelogging-glasses-2010067/>. 11 pages.

Kleiner, Keith. "The Vicon Life Recorder—Lifelogging Takes Another Step Forward." Singularity Hub [online]. Oct. 28, 2009. Retrieved from the Internet on Oct. 21, 2010: URL: <http://singularityhub.com/2009/10/28/the-vicon-life-recorder-lifelogging-takes-another-step-forward/>. Eight pages.

Otani, Takuya. "Hitachi Shows Off Low-priced Wearable Life Recorders." Tech-On [online]. Jul. 26, 2010. Retrieved from the Internet on Oct. 21, 2010: URL: <http://techon.nikkeibp.co.jp/english/NEWS_EN/20100726/184494/>. Two pages.

Ratcliff, John. "Life recorder." John Ratcliffs Weblog [online]. May 5, 2009. Retrieved from the Internet on Oct. 21, 2010: URL: <http://jratcliffscarab.blogspot.com/2009/05/life-recorder.html>. 14 pages.

Schneier, Bruce. "Life Recorder." Schneier on Security [online]. Apr. 19, 2010. Retrieved from the Internet on Oct. 21, 2010: URL: <http://www.schneier.com/blog/archives/2010/04/life_recorder.html>. 14 pages.

U.S. Appl. No. 13/296,585, filed Nov. 15, 2011.

* cited by examiner

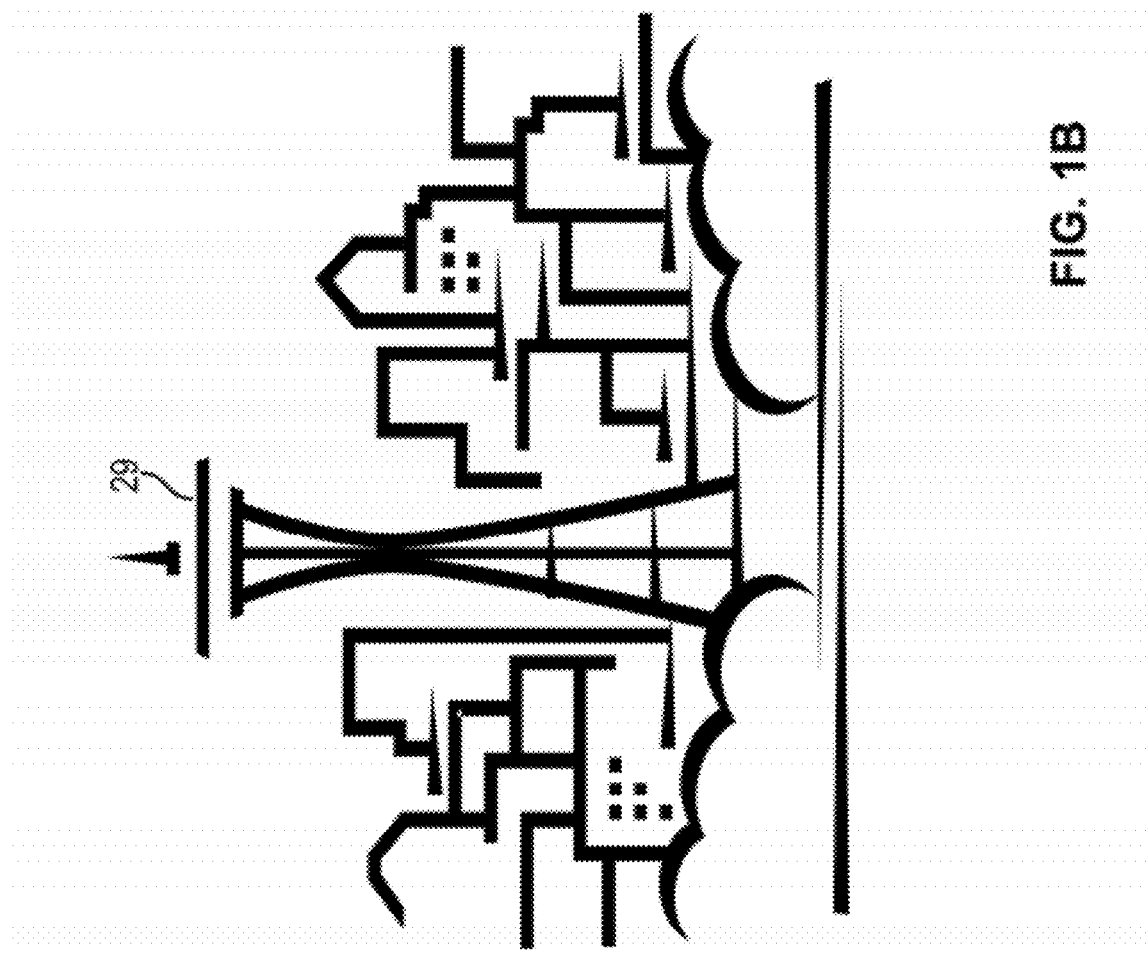
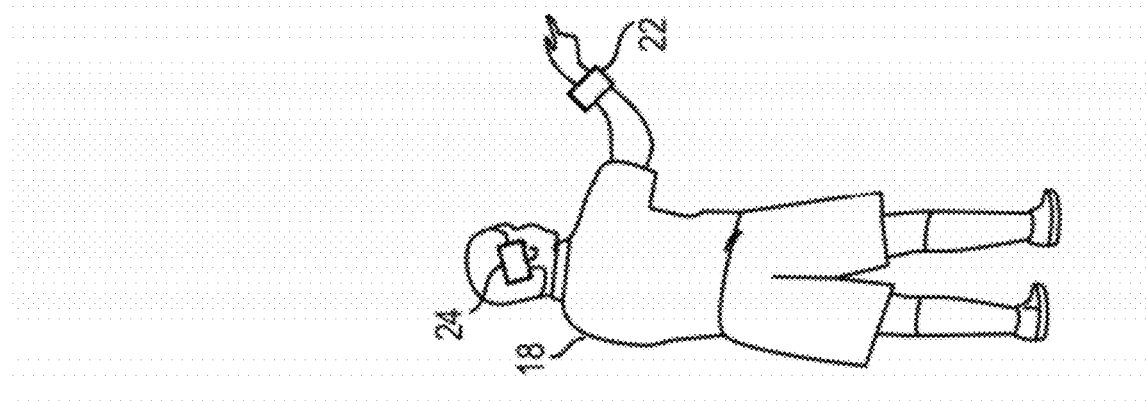
FIG. 1B

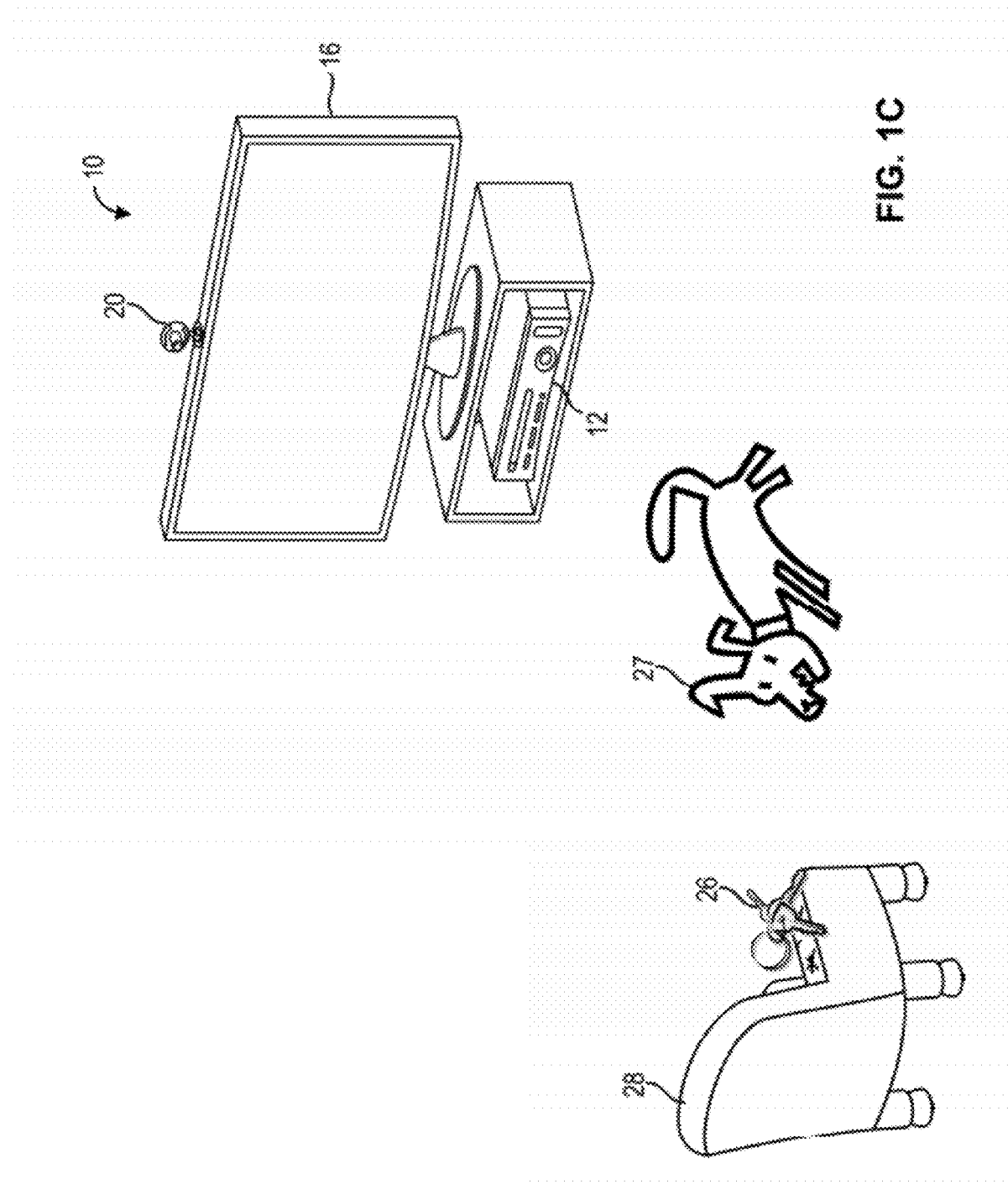

Pushing filter 602

Transmit the life recording to <My Husband> if:

> Location: <My home>
> Time: Any
> Event: Any
> Situation: Recognize a baby crawling                 604

Transmit the life recording to <My Sister Sally> if:

> Location: Disneyland
> Time: 9:00 a.m. – 5:00 p.m.
> Event: On vacation
> Situation: Recognize Mickey Mouse                    606

Receiving filter 612

Will receive the life recording if:

> Time: 8:00 a.m. – 8:00 p.m.
> From: <My Wife>
> Situation: Any                                       614

FIG. 4C

Summarizing filter 622

Summarize the life recording to <My remote storage> if:

> Location: <My home>
> Time: Any
> Event: Any
> Situation: Recognize <My keys>                    624

Summarize the life recording to <Cloud storage location> if:

> Location: <My work>
> Time: Any
> Event: Meeting with Bill
> Situation: Any                                    626

Recording Summary Index 672

Information regarding Recording Summary #1:

> Link to summary: <My remote storage>
> Location: <My home>
> Date / Time: January 11, 2011 / 9:03 p.m. – 9:04 p.m.
> Event: N/A
> Situation: Recognized <My keys>                   674

Information regarding Recording Summary #2:

> Link to summary: <Cloud storage location>
> Location: Disneyland
> Date / Time: June 21, 2010 / 2:11 p.m. – 2:19 p.m.
> Event: On vacation
> Situation: Recognized Mickey Mouse                676

FIG. 7

LIFE STREAMING

BACKGROUND

Today, many mobile devices such as cell phones and digital cameras employ camera technology capable of recording digital images and videos. The proliferation of camera technology combined with the ability to cheaply capture digital images has allowed camera users to capture more life experiences than was previously feasible. The process of capturing images typically requires a conscious effort from the camera user to select a field of view and/or to determine when to capture the image. In the most typical example, a camera user must position the camera in the direction of a particular field of view and activate a trigger for capturing the image. Although the trigger for capturing an image may be automated using a timing or motion-sensing device, a conscious effort from the camera user is still required to determine the particular field of view (e.g., the placement of a security or traffic camera).

With the widespread adoption of the Internet, camera users may transmit or publish digital images immediately after being captured and recorded. For example, digital images may be immediately emailed to friends or uploaded to social networking websites. However, despite the advances in camera technology and the ability to exchange information over the Internet in real-time, people still miss events and experiences that they would have wanted to share or participate in.

SUMMARY

Technology is described for analyzing, summarizing, and transmitting life experiences captured using a life recorder. A life recorder is a recording device that continuously captures life experiences, including unanticipated life experiences, in image, video, and/or audio recordings. In some embodiments, the video and/or audio recordings generated by a life recorder are automatically summarized, indexed, and stored for future use. By indexing and storing life recordings, a life recorder may search for and acquire life recordings generated by itself or another life recorder, thereby allowing life experiences to be shared minutes or even years later. In some embodiments, recordings generated by a life recorder may be analyzed in real-time and automatically pushed to one or more target devices. The ability to automatically and instantaneously push life recordings as live feeds to one or more target devices allows friends and family to experience one's life experience as it is happening.

One embodiment includes acquiring a pushing filter associated with a life recorder and which includes one or more requirements for determining when to transfer data from the life recorder to a target device, acquiring a life recording, generating context information associated with the life recording, identifying a particular situation from the life recording, detecting a push condition including automatically comparing the particular situation with the one or more requirements and automatically comparing the context information with the one or more requirements, and automatically transmitting data associated with the life recording to the target device in response to detecting the push condition.

One embodiment includes acquiring one or more requirements for determining when to display data associated with a second life recorder, acquiring a recording summary index associated with the second life recording, acquiring a life recording at a first life recorder, generating context information associated with the life recording, identifying a particular situation from the life recording, detecting a display condition including automatically comparing the particular situation with the one or more requirements and automatically comparing the context information with the one or more requirements, receiving a recording summary associated with an entry in the recording summary index, and automatically displaying the recording summary in response to detecting the display condition and receiving the recording summary.

On embodiment includes a digital video camera and one or more processors. The digital video camera captures a live feed. The one or more processors are in communication with the digital video camera. The one or more processors receive one or more requirements for pushing the live feed to a target device, generate context information associated with the live feed, identify a particular situation from the live feed, determine whether the one or more requirements are satisfied by the context information and the particular situation, receive a receiving filter from the target device, determine whether the receiving filter is satisfied by the context information and the particular situation, and transmit at least a portion of the live feed to the target device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1B depicts the use of mobile life recorders to record a person's life experiences.

FIG. 1C depicts the use of a non-mobile life recorder in a home environment.

FIG. 4C depicts a pushing filter and a receiving filter.

FIG. 7 depicts one embodiment of a summarizing filter and a recording summary index.

DETAILED DESCRIPTION

Technology is described for analyzing, summarizing, and transmitting life experiences captured using a life recorder. A life recorder is a recording device that continuously captures life experiences, including unanticipated life experiences, in image, video, and/or audio recordings. In some embodiments, the video and/or audio recordings generated by a life recorder are automatically summarized, indexed, and stored for future use. By indexing and storing life recordings, a life recorder may search for and acquire life recordings generated by itself or another life recorder, thereby allowing life experiences to be shared minutes or even years later. In some embodiments, recordings generated by a life recorder may be analyzed in real-time and automatically pushed to one or more target devices. The ability to automatically and instantaneously push life recordings as live feeds to one or more target devices allows friends and family to experience one's life experience as it is happening.

The life experiences captured by a life recorder may be summarized, indexed, and stored in a searchable digital archive. The searchable digital archive may comprise a remote storage and/or application server. A searchable digital archive of captured life experiences has many practical applications including allowing users of a computing device to search for and download life recordings associated with where they last saw their house keys, when and where they first met someone, and what was said during an unexpected conversation. The life recordings generated by users of one or more different life recorders may also be searched and downloaded. With a searchable digital archive, people no longer need to rely on their sometimes faulty or inaccurate memories when sharing or reliving life experiences.

Moreover, the life experiences captured by a life recorder may also be buffered and automatically analyzed for detection of a particular condition. Upon detection of the particular condition, the life recorder may automatically transmit or push a life recording as a live feed to another computing device. The ability to automatically push a life recording in real-time may be especially useful when the person wearing the life recorder is not able to perform steps necessary to transmit the life recording by themselves (e.g., when a child or non-lucid elderly parent are in need of assistance).

Figure 1A:
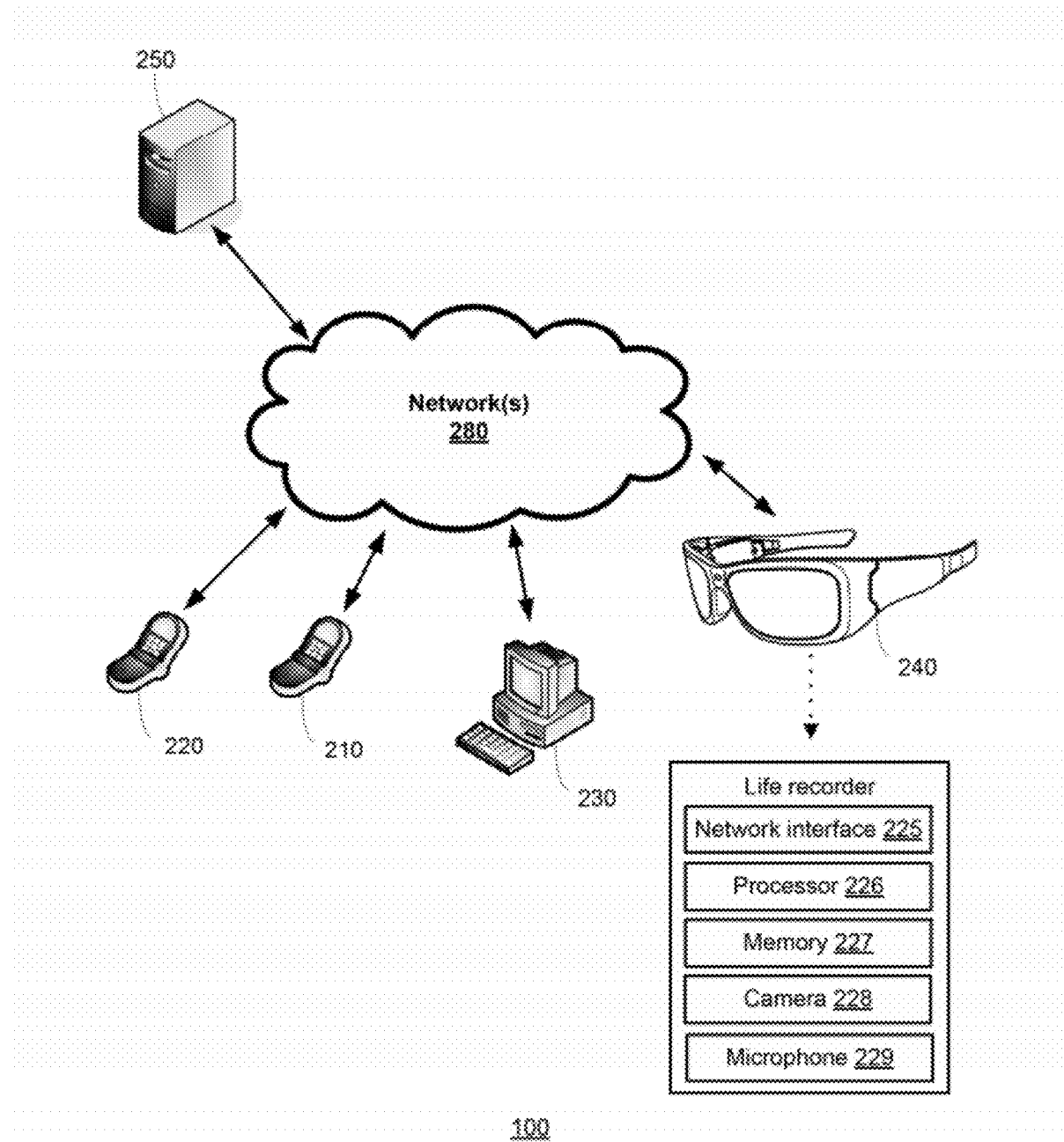
FIG. 1A is a block diagram of one embodiment of a networked computing environment in which the disclosed technology may be practiced.

FIG. 1A is a block diagram of one embodiment of a networked computing environment 100 in which the disclosed technology may be practiced. Networked computing environment 100 includes a plurality of computing devices interconnected through one or more networks 280. The one or more networks 280 allow a particular computing device to connect to and communicate with another computing device. The depicted computing devices include life recorder 240, mobile devices 220 and 210, desktop computer 230, and application server 250. In some embodiments, the plurality of computing devices may include other computing devices not shown. In some embodiments, the plurality of computing devices may include more than or less than the number of computing devices shown in FIG. 1A. The one or more networks 280 may include a secure network such as an enterprise private network, an unsecure network such as a wireless open network, a local area network (LAN), a wide area network (WAN), and the Internet. Each network of the one or more networks 280 may include hubs, bridges, routers, switches, and wired transmission media such as a wired network or direct-wired connection.

An application server, such as application server 250, may allow a client to download content (e.g., audio, image, and video files) from the application server or to perform a search query related to the content. In one example, a client may download video and audio recordings associated with a life recorder. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of life recorder 240 includes a camera 228, microphone 229, network interface 225, processor 226, and memory 227, all in communication with each other. Camera 228 may capture digital images and/or videos. Microphone 229 may capture sounds. Network interface 225 allows life recorder 240 to connect to one or more networks 280. Network interface 225 may include a wireless network interface, a modem, and/or a wired network interface. Processor 226 allows life recorder 240 to execute computer readable instructions stored in memory 227 to perform the processes discussed herein.

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer network diagrams to depict the Internet as an abstraction of the underlying infrastructure it represents.

In one embodiment, life recorder 240 captures a life recording, buffers and analyzes the life recording in real-time, and automatically transmits the life recording as a live feed to a computing device such as mobile device 210. In another embodiment, application server 250 is used as a remote storage server for life recordings. By indexing and storing life recordings on application server 250, other computing devices, such as life recorder 240, may search for and download life recordings associated with other life recorders. In one example, life recorder 240 captures a first life recording, buffers and analyzes the first life recording in real-time, analyzes a recording summary index associated with a different life recorder, downloads a second life recording associated with the different life recorder from application server 250, and displays the second life recording.

FIG. 1B depicts the use of mobile life recorders to record a person's life experiences. Mobile life recorders are typically unobtrusive and lightweight such that one or more mobile life recorders may be attached to a person or their clothing. In FIG. 1B, mobile life recorder 22 is attached to the wrist of user 18 and mobile life recorder 24 is attached to the ear of user 18. In one example, life recorder 24 corresponds to life recorder 240 in FIG. 1A. A benefit of the positioning used by life recorder 24 is that its capture range may be inline with the viewing range of user 18 (i.e., the visual recording may correspond with what user 18 was looking at). By wearing mobile life recorders 22 and 24, user 18 may record his or her life experiences as they occur. In one embodiment, mobile life recorder 24 generates a life recording and detects a particular object such as landmark object 29 in the life recording. Upon detection of landmark object 29, life recorder 24 may automatically transmit the life recording to another computing device such as mobile device 210 in FIG. 1A.

FIG. 1C depicts the use of a non-mobile life recorder in a home environment. Non-mobile life recorder 10 may be positioned within a room in a home, such as the living room, in order to continuously capture and record life experiences that occur within the room. In FIG. 1C, non-mobile life recorder 10 includes computing environment 12 and capture device 20, in communication with each other. Computing environment 12 may include one or more processors. Capture device 20 may include a color and/or depth sensing camera that may be used to visually monitor one or more targets including humans and one or more objects including keys 26, chair 28, and dog 27. In one example, capture device 20 may comprise a webcam and computing environment 12 may comprise a set-top box. In one embodiment, life recorder 10 generates a life recording and detects a particular object (e.g., keys 26) or a particular situation (e.g., dog 27 jumping into chair 28). Upon detection of the particular object or particular situation, life recorder 10 may automatically transmit the life recording to another computing device such as mobile device 210 in FIG. 1A.

In one embodiment, capture device 20 may capture image and audio data relating to one or more targets and/or objects. For example, capture device 20 may be used to capture information relating to partial or full body movements, gestures, and speech of one or more users. The information captured by capture device 20 may be received by computing environment 12 and/or a processing element within capture device 20 and used to render, interact with, and control aspects of the life recorder. In one example, capture device 20 captures image and audio data relating to a particular user and processes the captured information to identify the particular user by executing facial and voice recognition software.

Suitable examples of life recorders, such as non-mobile life recorder 10, and components thereof may be found in the following co-pending patent applications, all of which are herein incorporated by reference in their entirety: U.S. patent application Ser. No. 12/475,094, entitled "Environment And/Or Target Segmentation," filed May 29, 2009; U.S. patent application Ser. No. 12/511,850, entitled "Auto Generating a Visual Representation," filed Jul. 29, 2009; U.S. patent application Ser. No. 12/474,655, entitled "Gesture Tool," filed May 29, 2009; U.S. patent application Ser. No. 12/603,437, entitled "Pose Tracking Pipeline," filed Oct. 21, 2009; U.S. patent application Ser. No. 12/475,308, entitled "Device for Identifying and Tracking Multiple Humans Over Time," filed May 29, 2009, U.S. patent application Ser. No. 12/575,388, entitled "Human Tracking System," filed Oct. 7, 2009; U.S. patent application Ser. No. 12/422,661, entitled "Gesture Recognizer System Architecture," filed Apr. 13, 2009; and U.S. patent application Ser. No. 12/391,150, entitled "Standard Gestures," filed Feb. 23, 2009.

In one embodiment, the computing environment 12 and/or capture device 20 may be connected to an audiovisual device 16 such as a television, a monitor, or a high-definition television (HDTV) for displaying and/or playing one or more life recordings. In one example, the computing environment 12 may include a video adapter such as a graphics card and/or an audio adapter such as a sound card that may provide audiovisual signals associated with a computing application running on the life recorder. The audiovisual device 16 may receive the audiovisual signals from the computing environment 12 and may output visuals associated with one or more video recordings and audio signals associated with one or more audio recordings. In one embodiment, the audiovisual device 16 may be connected to computing environment 12 via, for example, an S-Video cable, a coaxial cable, an HDMI cable, a DVI cable, a VGA cable, or the like.

Figure 2A:
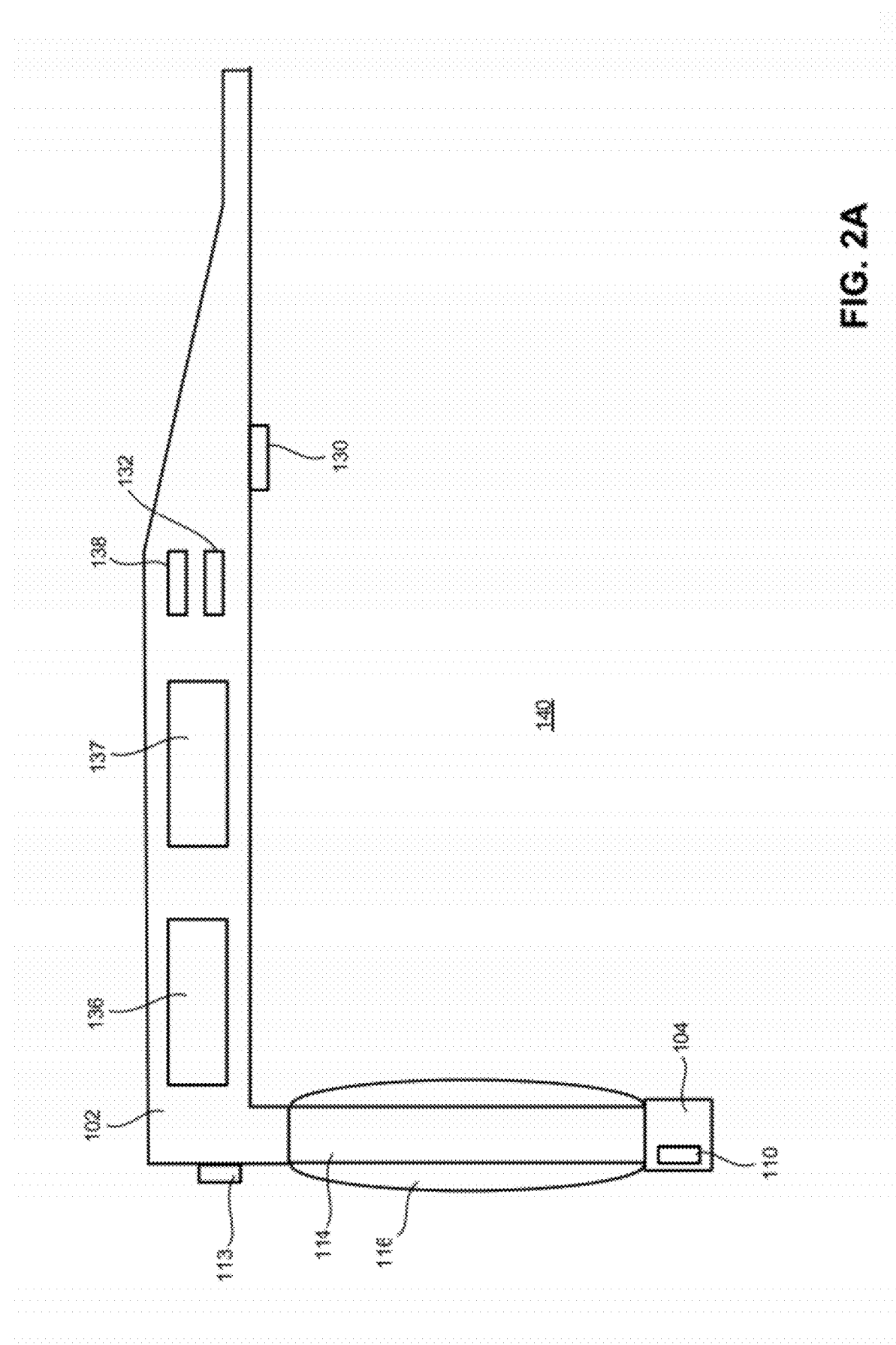
FIG. 2A depicts one embodiment of a portion of a head-mounted life recorder.

FIG. 2A depicts one embodiment of a portion of a head-mounted life recorder, such as life recorder 240 in FIG. 1A. Only the right side of head-mounted life recorder 140 is depicted. Head-mounted life recorder 140 includes right temple 102, nose bridge 104, eye glass 116, and eye glass frame 114. Built into nose bridge 104 is a microphone 110 for recording sounds and transmitting the audio recording to processing unit 136. A front facing camera 113 is embedded inside right temple 102 for recording digital images and videos and transmitting the visual recordings to processing unit 136. Front facing camera 113 and microphone 110 may be viewed as comprising a capture device similar to capture device 20 in FIG. 1C. Microphone 110 and front facing camera 113 are in communication with processing unit 136.

Also embedded inside right temple 102 are ear phones 130, motion and orientation sensor 138, temperature sensor 132, and wireless interface 137, all in communication with processing unit 136. Motion and orientation sensor 138 may include a three axis magnetometer, a three axis gyro, and a three axis accelerometer. Processing unit 136 may include one or more processors and a memory for storing computer readable instructions to be executed on the one or more processors. Processing unit 136 may be viewed as comprising a computing environment similar to computing environment 12 in FIG. 1C. Further details of capture devices and computing environments will be described below with reference to FIG. 2B.

Figure 2B:
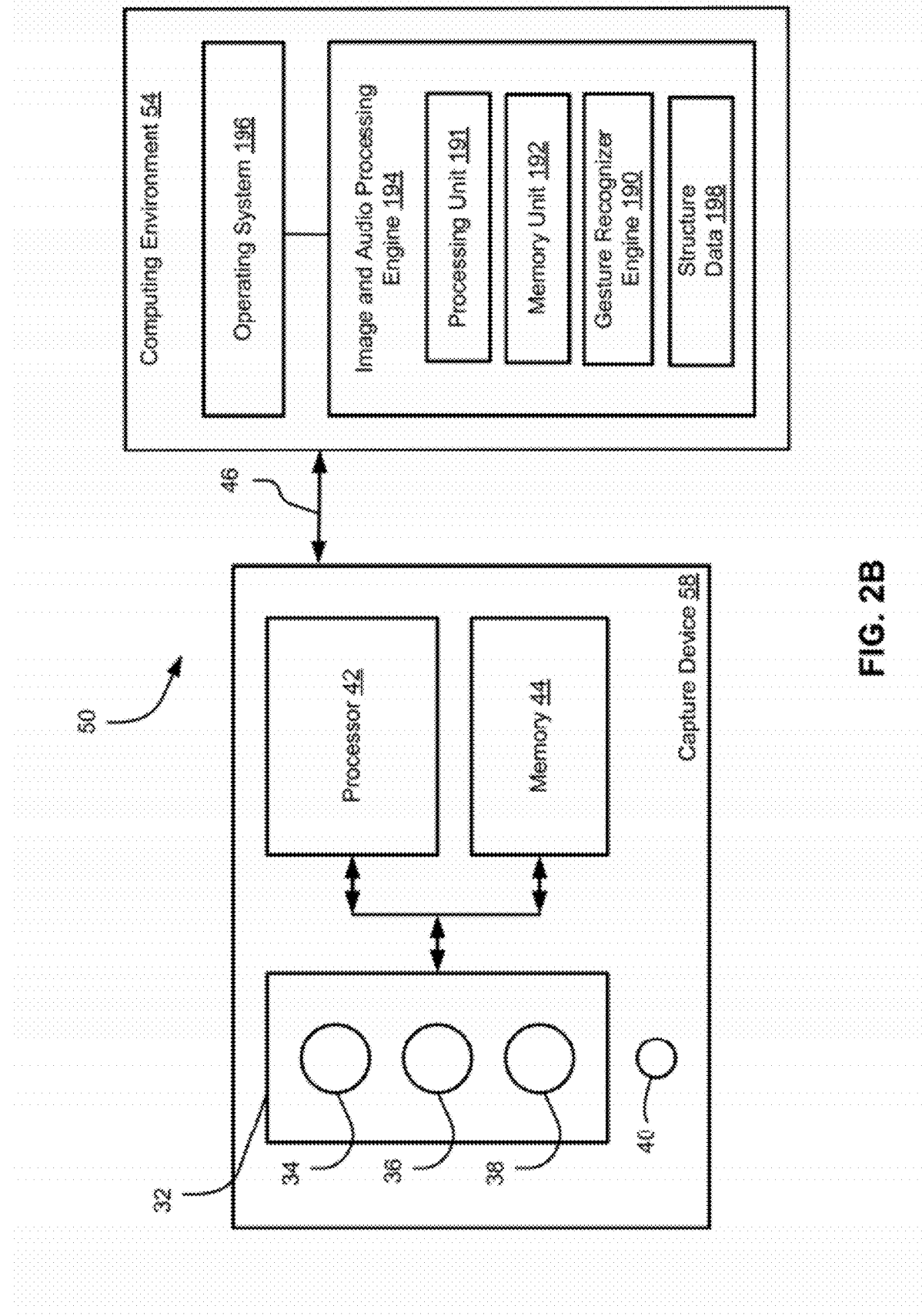
FIG. 2B illustrates one embodiment of a life recorder including a capture device and computing environment.

FIG. 2B illustrates one embodiment of a life recorder 50 including a capture device 58 and computing environment 54. Life recorder 50 may be a mobile life recorder or a non-mobile life recorder. In one example, computing environment 54 corresponds with computing environment 12 in FIG. 1C and capture device 58 corresponds with capture device 20 in FIG. 1C. In another example, and with reference to mobile life recorders 22 and 24 in FIG. 1B, the capture device 58 and computing environment 54 may be integrated within a single housing.

In one embodiment, the capture device 58 may include one or more image sensors for capturing images and videos. An image sensor may comprise a CCD image sensor or a CMOS sensor. In some embodiments, capture device 58 may include an IR CMOS image sensor. The capture device 58 may also include a depth camera (or depth sensing camera) configured to capture video with depth information including a depth image that may include depth values via any suitable technique including, for example, time-of-flight, structured light, stereo image, or the like.

The capture device 58 may include an image camera component 32. In one embodiment, the image camera component 32 may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

The image camera component 32 may include an IR light component 34, a three-dimensional (3-D) camera 36, and an RGB camera 38 that may be used to capture the depth image of a capture area. For example, in time-of-flight analysis, the IR light component 34 of the capture device 58 may emit an infrared light onto the capture area and may then use sensors to detect the backscattered light from the surface of one or more targets and objects in the capture area using, for example, the 3-D camera 36 and/or the RGB camera 38. In some embodiments, pulsed infrared light may be used such that the time between an outgoing light pulse and a corresponding incoming light pulse may be measured and used to determine a physical distance from the capture device 58 to a particular location on the targets or objects in the capture area. Additionally, the phase of the outgoing light wave may be compared to the phase of the incoming light wave to determine a phase shift. The phase shift may then be used to determine a physical distance from the capture device to a particular location on the targets or objects.

In another example, the capture device 58 may use structured light to capture depth information. In such an analysis, patterned light (i.e., light displayed as a known pattern such as grid pattern or a stripe pattern) may be projected onto the capture area via, for example, the IR light component 34. Upon striking the surface of one or more targets (or objects) in the capture area, the pattern may become deformed in response. Such a deformation of the pattern may be captured by, for example, the 3-D camera 36 and/or the RGB camera 38 and analyzed to determine a physical distance from the capture device to a particular location on the targets or objects.

In some embodiments, two or more different cameras may be incorporated into an integrated capture device. For example, a depth camera and a video camera (e.g., an RGB video camera) may be incorporated into a common capture device. In some embodiments, two or more separate capture devices of the same or differing types may be cooperatively used. For example, a depth camera and a separate video camera may be used, two video cameras may be used, two depth cameras may be used, two RGB cameras may be used or any combination and number of cameras may be used. In one embodiment, the capture device 58 may include two or more physically separated cameras that may view a capture area from different angles to obtain visual stereo data that may be resolved to generate depth information. Depth may also be determined by capturing images using a plurality of detectors that may be monochromatic, infrared, RGB, or any other type of detector and performing a parallax calculation. Other types of depth image sensors can also be used to create a depth image.

As shown in FIG. 2B, capture device 58 may include a microphone 40. The microphone 40 may include a transducer or sensor that may receive and convert sound into an electrical signal. In one embodiment, the microphone 40 may be used to reduce feedback between the capture device 20 and the computing environment 54 in the life recorder 10. Additionally, the microphone 40 may be used to receive audio signals that may also be provided by the user to control applications such as life recording applications or the like that may be executed by the computing environment 54.

In one embodiment, the capture device 58 may include a processor 42 that may be in operative communication with the image camera component 32. The processor 42 may include a standardized processor, a specialized processor, a microprocessor, or the like. The processor 42 may execute instructions that may include instructions for storing filters or profiles, receiving and analyzing images, determining whether a particular situation has occurred, or any other suitable instructions. It is to be understood that at least some image analysis and/or target analysis and tracking operations may be executed by processors contained within one or more capture devices such as capture device 58.

The capture device 58 may include a memory component 44 that may store the instructions that may be executed by the processor 42, images or frames of images captured by the 3-D camera or RGB camera, life recorder filters or profiles, or any other suitable information, images, or the like. In one example, the memory component 44 may include random access memory (RAM), read only memory (ROM), cache, Flash memory, a hard disk, or any other suitable storage component. As shown in FIG. 2B, the memory component 44 may be a separate component in communication with the image capture component 32 and the processor 42. In another embodiment, the memory component 44 may be integrated into the processor 42 and/or the image capture component 32.

In one embodiment, some or all of the components 32, 34, 36, 38, 40, 42 and 44 of the capture device 58 illustrated in FIG. 2B are housed in a single housing.

The capture device 58 may be in communication with the computing environment 54 via a communication link 46. The communication link 46 may be a wired connection including, for example, a USB connection, a FireWire connection, an Ethernet cable connection, or the like and/or a wireless connection such as a wireless 802.11b, g, a, or n connection. The computing environment 54 may provide a clock to the capture device 58 that may be used to determine when to capture, for example, a scene via the communication link 46. In one embodiment, the capture device 58 may provide the images captured by, for example, the 3-D camera 36 and/or the RGB camera 38 to the computing environment 54 via the communication link 46.

As shown in FIG. 2B, computing environment 54 includes image and audio processing engine 194 in communication with operating system 196. Image and audio processing engine 194 includes gesture recognizer engine 190, structure data 198, processing unit 191, and memory unit 192, all in communication with each other. Image and audio processing engine 194 processes video, image, and audio data received from capture device 58. To assist in the detection and/or tracking of objects, image and audio processing engine 194 may utilize structure data 198 and gesture recognition engine 190.

Processing unit 191 may include one or more processors for executing object, facial, and voice recognition algorithms. In one embodiment, image and audio processing engine 194 may apply object recognition and facial recognition techniques to image or video data. For example, object recognition may be used to detect particular objects (e.g., soccer balls, cars, or landmarks) and facial recognition may be used to detect the face of a particular person. Image and audio processing engine 194 may apply audio and voice recognition techniques to audio data. For example, audio recognition may be used to detect a particular sound. The particular faces, voices, sounds, and objects to be detected may be stored in one or more memories contained in memory unit 192.

In some embodiments, one or more objects being tracked may be augmented with one or more markers such as an IR retroreflective marker to improve object detection and/or tracking. Upon detection of one or more targets or objects, image and audio processing engine 194 may report to operating system 196 an identification of each object detected and a corresponding position and/or orientation.

The image and audio processing engine 194 may utilize structural data 198 while performing object recognition. Structure data 198 may include structural information about targets and/or objects to be tracked. For example, a skeletal model of a human may be stored to help recognize body parts. In another example, structure data 198 may include structural information regarding one or more inanimate objects in order to help recognize the one or more inanimate objects.

The image and audio processing engine 194 may also utilize gesture recognizer engine 190 while performing object recognition. In one example, gestures recognizer engine 190 may include a collection of gesture filters, each comprising information concerning a gesture that may be performed by a skeletal model. The gesture recognition engine 190 may compare the data captured by capture device 58 in the form of the skeletal model and movements associated with it to the gesture filters in the gesture library 192 to identify when a user (as represented by the skeletal model) has performed one or more gestures. In one example, image and audio processing engine 194 may use the gesture recognition engine 190 to help interpret movements of a skeletal model and to detect the performance of a particular gesture.

More information about gesture recognizer engine 190 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool" filed on May 29, 2009, both of which are incorporated by reference herein in their entirety. More information about motion detection and tracking can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety.

Figure 3:
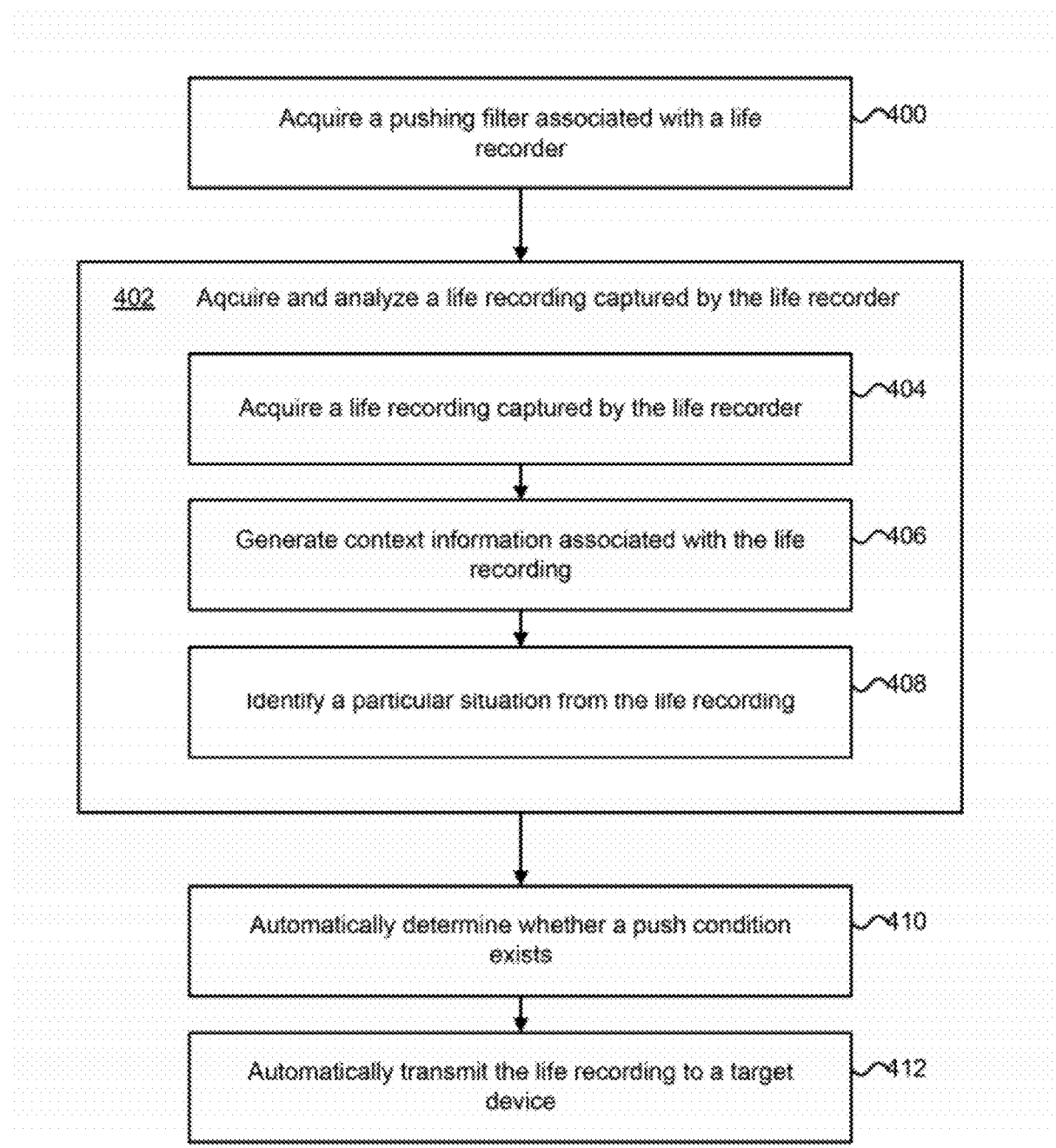
FIG. 3 is a flowchart describing one embodiment of a process for automatically pushing life recordings to one or more target devices.

FIG. 3 is a flowchart describing one embodiment of a process for automatically pushing life recordings to one or more target devices. The process of FIG. 3 may be performed continuously by a life recorder. The process of FIG. 3 may be performed by one or more computing devices. Each step in the process of FIG. 3 may be performed by the same or different computing devices as those used in other steps, and each step need not necessarily be performed by a single computing device. In one embodiment, the process of FIG. 3 is performed continuously by a life recorder such as life recorder 240 in FIG. 1A.

In step 400, a pushing filter associated with a life recorder is acquired. The pushing filter may include one or more rules (or requirements) for determining when to transfer data from the life recorder to a particular target device. If the one or more rules for determining when to transfer data from the life recorder to a particular target device have already been acquired, then step 400 may be omitted.

In step 402, a life recording captured by the life recorder is acquired and analyzed. Information from both the life recorder generating the life recording and the life recording itself may be analyzed to determine whether a particular condition or situation has occurred. The analysis of the life recording may take into consideration context information, which includes information associated with the life recording but not necessarily acquired from the life recording itself (e.g., the GPS location of the life recorder, the date of a life recording, and the start and end times associated with a life recording). While a portion of a life recording is being analyzed, the life recorder may continue to capture new life experiences. In one embodiment, analysis may be performed on a portion of a life recording in real-time (i.e., as it is being captured), at regular time intervals (e.g., every 30 seconds), or upon a triggering event associated with the life recording (e.g., the user of the life recorder pushes a button). In one embodiment, step 402 includes steps 404, 406, and 408.

In step 404, a life recording captured by the life recorder is acquired. In one example, a capture device, such as capture device 58 in FIG. 2B, may be used to acquire video and/or audio recordings of one or more life experiences. Once a life recording has been acquired, a portion of the life recording may be buffered to facilitate analysis of the life recording. For example, the last two minutes of a particular life recording may be stored in a memory buffer for analysis. In one embodiment, video and/or audio recordings captured by a life recorder over a particular period of time (e.g., 30 minutes) may be placed into a memory buffer. In the case of a cyclic buffer, if the video and/or audio recordings are not summarized and/or stored elsewhere within the particular period of time, then the data associated with the video and/or audio recordings may be overwritten.

In step 406, context information associated with the life recording or some portion thereof is generated. Context information may include location and time information associated with the life recording. Location information may include GPS coordinates or other identification of a particular geographical location associated with the life recorder at the time of recording. Time information may include the particular date and time (e.g., a timestamp) associated with the life recorder at the time of recording. The location and time information may be generated by the life recorder itself via an integrated GPS device and time keeping device. The time information may also be obtained via the cloud. The context information may also include calendar information. In one embodiment, the life recorder acquires and considers calendar information associated with a user of the life recorder. The calendar information may include a description of the calendar event associated with the time of recording by the life recorder. In one example, at the time of recording a life recording, it may be determined that the time of recording is Jan. 11, 2011 at 2:05 p.m., the location of the life recorder is a particular GPS location, and the calendar information comprises the description "Meeting with client."

In step 408, a particular situation from the life recording or some portion thereof is identified. A particular situation may be identified from a video recording and/or an audio recording. A particular situation associated with an audio recording may be identified using voice recognition techniques. For example, voice recognition may be used to identify the voice of a particular person (e.g., a spouse) or to identify a particular phrase or comment (e.g., a phrase used in an emergency situation such as a call for help). The particular situation may also be identified from an audio recording by detecting significant changes in the pitch of a person's voice or detecting sounds associated with particular human actions such as crying, gasping, or heavy breathing.

A particular situation associated with a video (or image) recording may be identified using object, pattern, and/or facial recognition techniques. For example, facial recognition may be used to identify a particular person and object recognition may be used to identify a particular object within a portion of a video recording. In one example, the particular situation identified may include detecting of a particular object (e.g., a soccer ball) and a particular person (e.g., a friend). In another example, the particular situation identified may include a particular gesture (e.g., waiving) being performed by the particular person. The particular situation may also be identified using machine learning techniques that employ probabilistic and/or statistical analyses to detect one or more targets and/or objects. The machine learning techniques may learn to detect particular targets and/or objects from analyzing a training set of the particular targets and/or objects. More information about applying machine learning techniques to detect targets and/or objects in image and video recordings may be found in U.S. patent application Ser. No. 12/972,837, "Detection of Body and Props" filed Dec. 20, 2010, incorporated herein by reference in its entirety.

In step 410, it is automatically determined whether a push condition exists. If a push condition exists, then step 412 is performed. In some embodiments, a push condition is deemed to exist if the pushing filter is satisfied by the context information and one or particular situations identified in step 402. Further, some embodiments may require a receiving filter to also be satisfied by the context information and one or more particular situations identified in step 402. If a push condition does not exist, then step 412 is not performed. In one embodiment, regardless of whether a push condition is detected or not, the life recorder may continuously perform steps 402 and 410 in order to continuously check for the emergence of push conditions associated with newly captured life experiences.

In some embodiments, rather than a life recorder automatically determining the existence of a push condition, the push condition may be determined manually by a user of the life recorder. For example, when a user wishes to transmit a life recording, the user may physically push a button located on the life recorder or issue a specific voice command to the life recorder. Upon detection of the user's manual directive, the life recorder may transmit the life recording via the cloud or other network to a target device.

In step 412, the life recording is automatically transmitted or pushed to a target device. The target device may be specified in the pushing filter. In one embodiment, the data transfer takes place over a wireless connection. In one example, an FTP or HTTP connection is established over a wireless local area network between the life recorder and the target device. In another embodiment, a life recording that includes both audio and video information is automatically transmitted to a target device. The target device may include a computing device such as a mobile device, web server, or a social networking server.

Figure 4A:
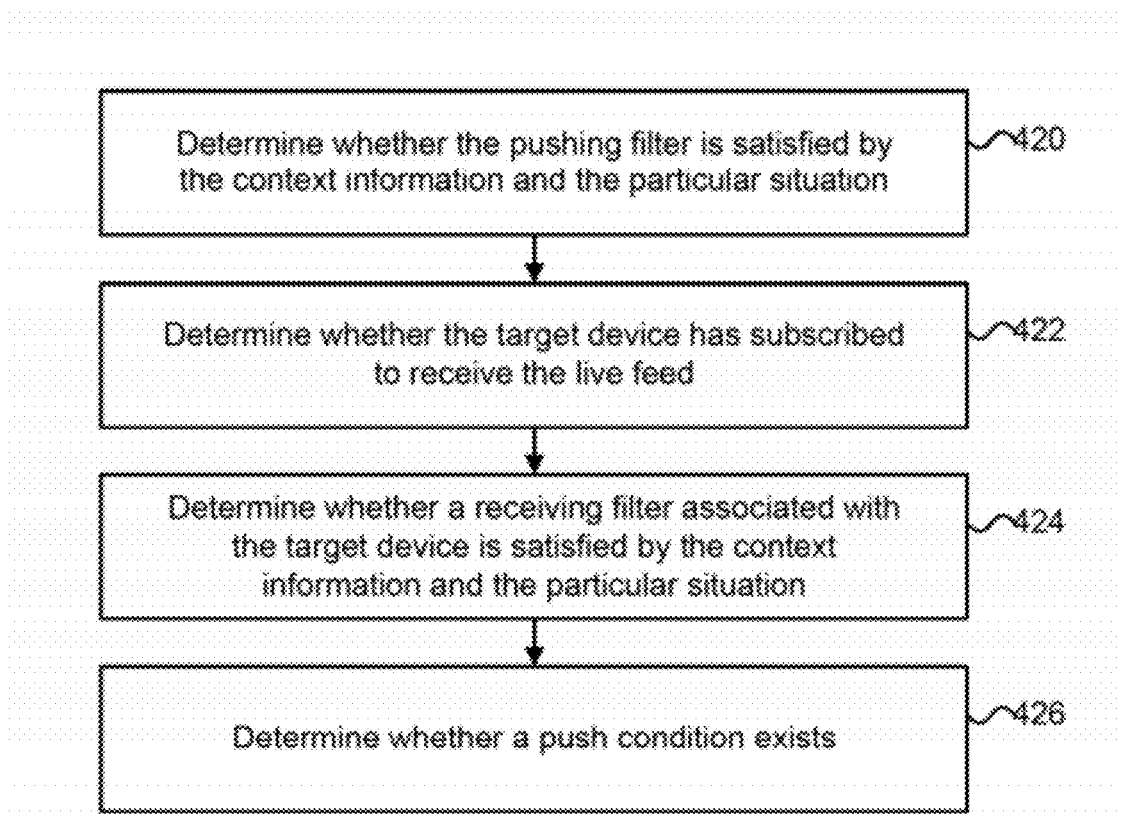
FIGS. 4A-4B include flowcharts describing embodiments of a process for automatically detecting the existence of a push condition.
Figure 4B:
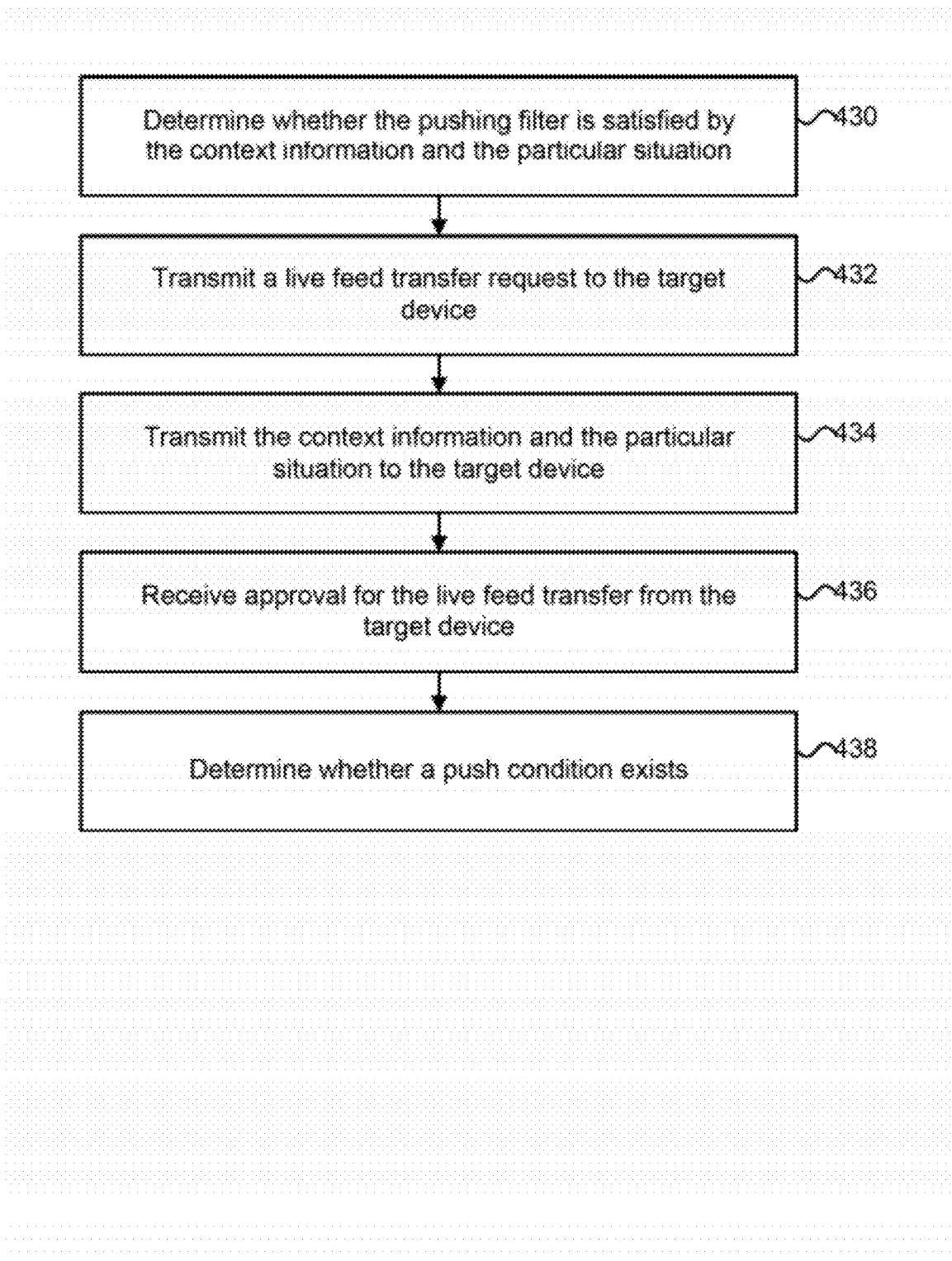

FIGS. 4A-4B include flowcharts describing embodiments of a process for automatically detecting whether a push condition exists. The processes described in FIGS. 4A-4B are only examples of processes for implementing step 410 in FIG. 3. The processes of FIGS. 4A-4B may be performed by one or more computing devices. Each step in the processes may be performed by the same or different computing devices as those used in other steps, and each step need not necessarily be performed by a single computing device. The processes of FIGS. 4A-4B may be performed by a life recorder such as life recorder 240 in FIG. 1A.

Referring to FIG. 4A, in step 420, it is determined whether the pushing filter is satisfied by the context information and particular situation identified in steps 406 and 408 of FIG. 3. A pushing filter may be satisfied if any of the set of requirements contained within the pushing filter are satisfied. If the pushing filter is satisfied, then step 422 is performed. If the pushing filter is not satisfied, then no additional steps are performed. In step 422, it is determined whether the target device has subscribed to receive the live feed. The life recorder may determine whether a target device has subscribed to receive a live feed by searching a list of subscribers stored on the life recorder. In some cases, a fee may be paid by a subscriber in order to be added to the list of subscribers. If the target device has subscribed to receive a live feed, then step 424 is performed. Otherwise, no additional steps are performed.

In step 424, it is determined whether a receiving filter associated with the target device is satisfied by the context information and particular situation identified in step 402 of FIG. 3. Each subscriber may provide to the life recorder a receiving filter that includes one or more requirements that must be satisfied prior to transmitting a live feed to the target device. If the receiving filter is satisfied, then step 426 is performed. If the receiving filter is not satisfied, then no additional steps are performed. In some embodiments, step 424 may also be omitted if no receiving filter is provided to the life recorder. In step 426, it is determined whether a push condition exists or has otherwise been detected. In one embodiment, a push condition exists if the target device has subscribed to receive a live feed and both the pushing and receiving filters are satisfied.

Referring to FIG. 4B, in step 430, it is determined whether the pushing filter is satisfied by the context information and particular situation identified in steps 406 and 408 of FIG. 3. A pushing filter may be satisfied if any of the set of requirements contained within the pushing filter are satisfied. If the pushing filter is satisfied, then step 432 is performed. If the pushing filter is not satisfied, then no additional steps are performed. In step 432, a live feed transfer request is transmitted to the target device. In step 434, the context information and particular situation identified in step 402 of FIG. 3 are transmitted to the target device. The context information and particular situation transmitted to the target device may be used by the target device to determine whether it should receive the live feed associated with the context information and particular situation. In step 436, approval for the live feed transfer is received from the target device. In step 438, it is determined whether a push condition exists or has been detected. In one embodiment, a push condition exists if the target device has received approval from the target device for the live feed and the pushing filter is satisfied.

FIG. 4C depicts one embodiment of a pushing filter 602 and a receiving filter 612. Pushing filter 602 includes a first set of requirements 604 and a second set of requirements 606. The first set of requirements 604 determines when a live feed will be transmitted to an electronic address (e.g., an IP address, network address, or email address) associated with the term "<My Husband>." The second set of requirements 606 determines when a live feed will be transmitted to an electronic address (e.g., an IP address, network address, or email address) associated with the term "<My Sister Sally>."

Both the first set of requirements 604 and the second set of requirements 606 include fields for location, time, event, and situation. When all the fields in a set of requirements are satisfied, then the set of requirements is deemed to be satisfied. The location field corresponds with the geographical location for the life recording. The location field for first set of requirements 604 is assigned to a GPS location associated with the term "<My home>." The time field corresponds to the time of the life recording. Because the process for automatically pushing life recordings transmits the live feed in real-time, the time that the life recording is captured will be substantially the same as the time of the live feed transmission. The time field for the first set of requirements 604 may be satisfied anytime, while the time filed for the second set of requirements 606 may be satisfied only between the hours of 9:00 a.m. and 5:00 p.m. The event field corresponds with calendar information associated with a user of the life recorder. The event field for the second set of requirements 606 may only be satisfied if calendar information associated with the user of the life recorder specifies that the user is on vacation. The situation field corresponds with a particular situation that must be recognized or detected before automatically pushing a live feed. The situation field for the second set of requirements 606 may only be satisfied if the character Mickey Mouse is recognized.

Receiving filter 612 includes a first set of requirements 614. In this example, the receiving filter may only be satisfied, and a live feed may only be transmitted, if the transmission occurs between the hours of 8:00 a.m. and 8:00 p.m. and the source of the live feed is an electric address associated with the term "<My Wife>."

Figure 5:
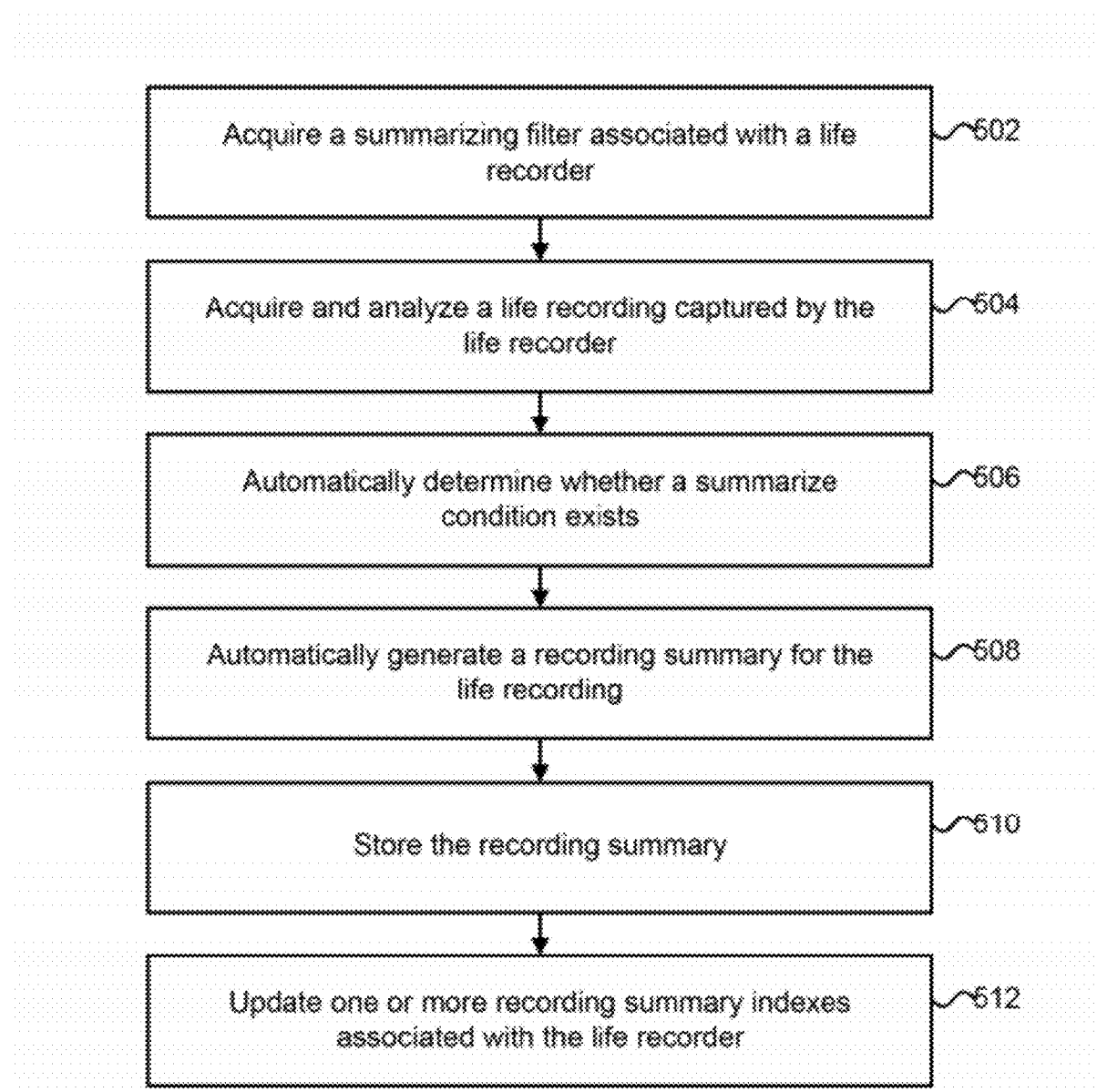
FIG. 5 is a flowchart describing one embodiment of a process for automatically summarizing life recordings and updating recording summaries.

FIG. 5 is a flowchart describing one embodiment of a process for automatically summarizing life recordings and updating recording summaries. The process of FIG. 5 may be performed continuously by a life recorder. The process of FIG. 5 may be performed by one or more computing devices.

Each step in the process of FIG. 5 may be performed by the same or different computing devices as those used in other steps, and each step need not necessarily be performed by a single computing device. In one embodiment, the process of FIG. 5 is performed continuously by a life recorder such as life recorder 240 in FIG. 1A.

In step 502, a summarizing filter associated with a life recorder is acquired. The summarizing filter may include one or more rules (or requirements) for determining when to summarize a life recording. If the one or more rules for determining when to summarize a life recording have already been acquired, then step 502 may be omitted.

In step 504, a life recording captured by the life recorder is acquired and analyzed. Information from both the life recorder generating the life recording and the life recording itself may be analyzed to determine whether a particular condition or situation has occurred. The analysis of the life recording may take into consideration context information, which includes information associated with the life recording but not necessarily acquired from the life recording itself (e.g., the GPS location of the life recorder, the date of a life recording, and the start and end times associated with a life recording). In one embodiment, step 504 performs steps 404, 406, and 408 of FIG. 3.

In step 506, it is automatically determined whether a summarize condition exists. If a summarize condition exists, then step 508 is performed. In some embodiments, a summarize condition is deemed to exist if the summarizing filter is satisfied by the context information and one or more particular situations identified in step 504. If a summarize condition does not exist, then no further steps are performed. In one embodiment, regardless of whether a summarize condition is detected or not, the life recorder may continuously perform steps 504 and 506 in order to continuously check for the emergence of summarize conditions associated with newly captured life experiences.

In step 508, a recording summary is automatically generated from the life recording. In one embodiment, a recording summary may comprise video and audio recordings associated with the time duration during which a set of requirements in the summarizing filter is satisfied. In another embodiment, a recording summary may comprise a video recording and/or audio recording associated with the time duration for which a particular situation was identified. For example, referring to FIG. 1C and in the case that a particular situation involves the appearance of a dog, if dog 27 enters the field of view for capture device 20 for a time duration of two minutes, then a recording summary may include the two minute video and audio recordings associated with the appearance of the dog. The resolution of the video and/or audio recordings may be adjusted depending on the time duration during which the particular situation was identified. A predetermined amount of time (e.g., 30 seconds) may also be added before and after the start and end times associated with the duration for which a particular situation was identified. In some embodiments, a recording summary may include images associated with start and end times associated with the identification of a particular situation. Additional images associated with time increments (e.g., every 2 minutes) between the start and end times associated with the identification of a particular situation may also be included. Moreover, an audio recording corresponding with the time duration during which the particular situation was identified may be converted into a text form and included in the recording summary.

In step 510, the recording summary generated in step 508 is stored for future use. The recording summary may be stored locally in a non-volatile memory on a life recorder or remotely on a remote storage server, such as application server 250 in FIG. 1A. The recording summary may also be stored in the cloud.

In one embodiment, a recording summary may be retrofitted or otherwise amended with images and/or audio not generated by the life recorder. For example, a recording summary regarding a vacation to a particular theme park may be amended to include an audio recording discussing the vacation recorded a year after the vacation. The recording summary may also be amended to include digital images of the particular theme park taken many years prior to the vacation. In one example, vacation photos of the particular theme park from the 1970s may be digitized and included within the recordings associated with the recording summary.

In step 512, one or more recording summary indexes associated with the life recorder are updated. A recording summary index may include a file that contains pointers to one or more recording summaries. The index need not contain the actual video and/or audio recordings pointed to. In one embodiment, a life recorder stores a recording summary index locally and updates the index every time a new recording summary is generated and stored. In another embodiment, a remote storage device used to store one or more recording summaries stores and updates the recording summary index associated with the one or more recording summaries. Upon updating a recording summary index stored locally or on a remote storage device, a copy of the updated recording summary index may be pushed to one or more computing devices. In one example, referring to FIG. 1A, application server 250 receives a recording summary from life recorder 240, updates a recording summary index associated with one or more recording summaries generated by life recorder 240, and pushes the updated recording summary index to mobile device 210. Mobile device 210 may subsequently search the recording summary index and request recording summaries from application server 250.

Figure 6A:
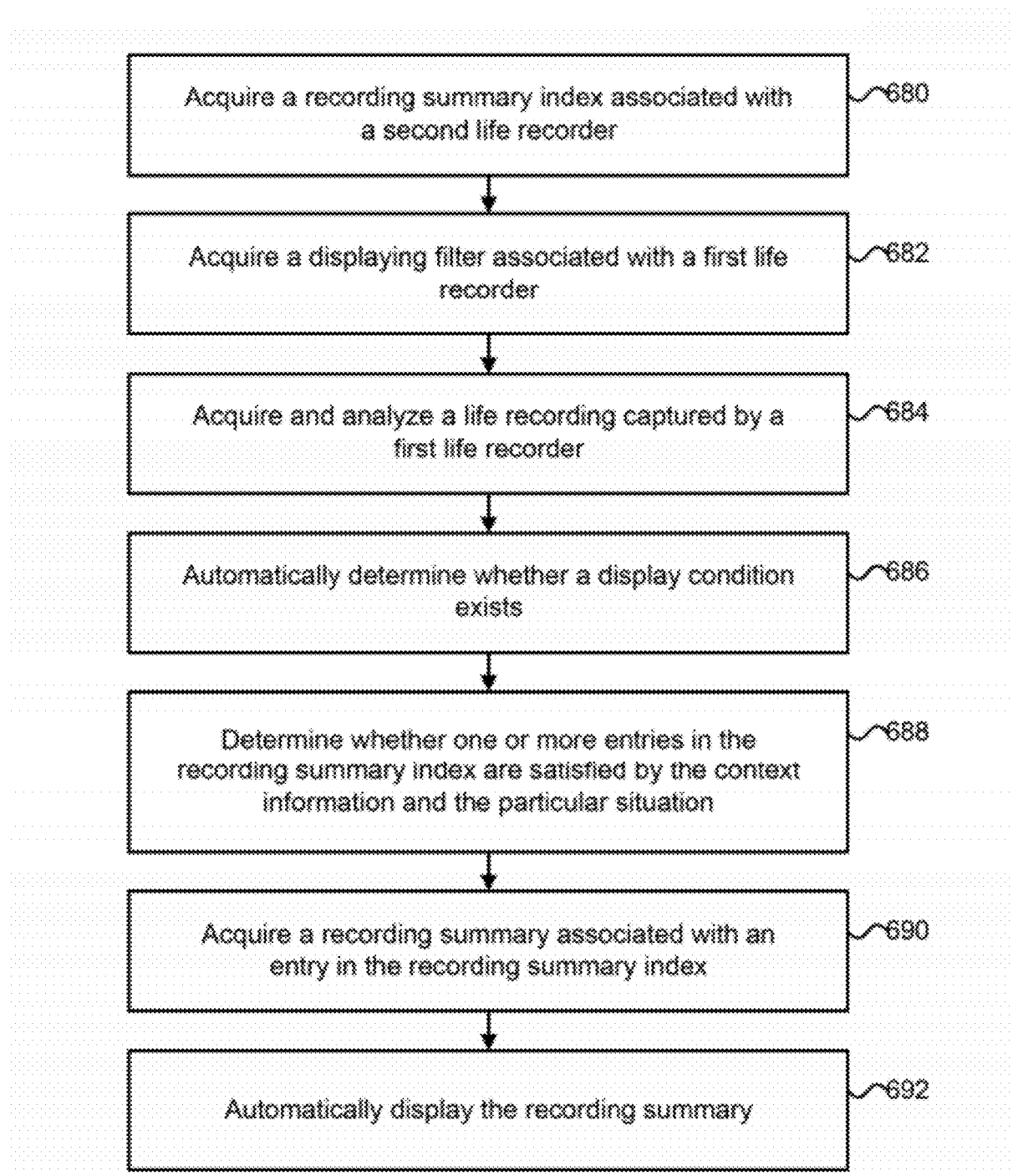
FIG. 6A is a flowchart describing one embodiment of a process for automatically displaying on a first life recorder life recordings associated with a second life recorder.

FIG. 6A is a flowchart describing one embodiment of a process for automatically displaying on a first life recorder life recordings associated with a second life recorder. The process of FIG. 6A may be performed continuously by a life recorder, upon a request from a user of a life recorder, or upon a triggering event associated with the life recording (e.g., the user of the life recorder pushes a button). The process of FIG. 6A may be performed by one or more computing devices. Each step in the process of FIG. 6A may be performed by the same or different computing devices as those used in other steps, and each step need not necessarily be performed by a single computing device. In one embodiment, the process of FIG. 6A is performed by a life recorder such as life recorder 240 in FIG. 1A.

In step 680, a recording summary index associated with a second life recorder is acquired. A recording summary index may include descriptions of one or more recording summaries as well as pointers or links to the one or more recording summaries. If a recording summary index has already been acquired, then step 680 may be omitted.

In step 682, a displaying filter associated with a first life recorder is acquired. The displaying filter may include one or more rules (or requirements) for determining when to acquire and display a recording summary. The displaying filter may allow recording summaries to be displayed that are related to a particular location or a particular time associated with a life recorder. A particular location may include a particular theme park or other geographic location at which the life recorder is deemed to exist. A particular time may include an anniversary date associated with a current date and time of the life recorder. If a displaying filter has already been acquired, then step 682 may be omitted.

In step 684, a life recording captured by the first life recorder is acquired and analyzed. Information from both the first life recorder generating the life recording and the life recording itself may be analyzed to determine whether a particular condition or situation has occurred. The analysis of the life recording may take into consideration context information, which includes information associated with the life recording but not necessarily acquired from the life recording itself (e.g., the GPS location of the life recorder, the date of a life recording, and the start and end times associated with a life recording). In one embodiment, step 684 performs steps 404, 406, and 408 of FIG. 3.

In step 686, it is automatically determined whether a display condition exists. If a display condition exists, then step 688 is performed. In some embodiments, a display condition is deemed to exist if the displaying filter is satisfied by the context information and one or more particular situations identified in step 684. If a display condition does not exist, then no further steps are performed. In one embodiment, regardless of whether a display condition is detected or not, the life recorder may continuously perform steps 684 and 686 in order to continuously check for the emergence of display conditions associated with newly captured life experiences.

In step 688, it is determined whether one or more entries in the recording summary index associated with the second life recorder are satisfied by the context information and the particular situation identified in step 684. If an entry in the recording summary index is satisfied, then step 690 is performed. If no entries are satisfied, then no further steps are performed. In step 690, a recording summary associated with a satisfied entry in the recording summary index is acquired. The recording summary, which was captured by a second life recorder, may be transmitted to the first life recorder over a wireless connection. In step 692, the recording summary is automatically displayed. In one embodiment, the recording summary is displayed on the first life recorder. For example, the recording summary may be displayed by presenting a video recording on an LCD screen or retina display of the first life recorder.

In one embodiment, a grandson may take his life recorder to a theme park. The grandson's life recorder may store a recording summary index associated with his grandfather's life recorder. The recording summary index stored on the grandson's life recorder may have been preloaded by the grandson or automatically loaded and/or updated via a subscription to the grandfather's life recordings. By walking around the theme park (or a particular section of the theme park), the grandson's life recorder may determine that a display condition exists. Once the grandson's life recorder detects a display condition, it may search the recording summary index associated with his grandfather's life recorder. Upon satisfaction of one or more of the index entries in the recording summary index, one or more recording summaries associated with the grandfather's life recorder may be downloaded to the grandson's life recorder and automatically displayed.

Figure 6B:
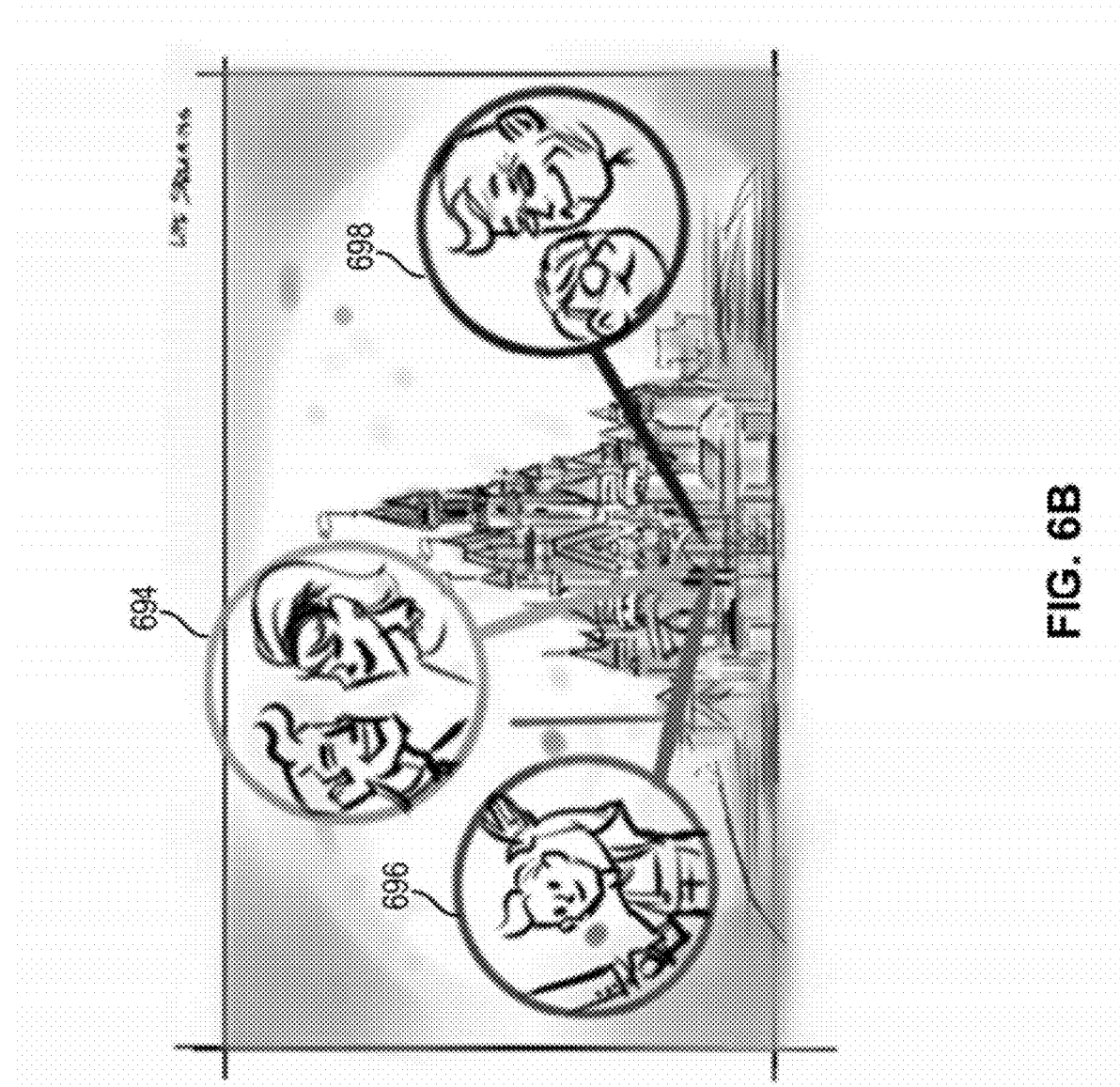
FIG. 6B illustrates a grandson and grandfather visiting a theme park together and utilizing the process of FIG. 6A.

FIG. 6B illustrates a grandson and grandfather visiting a theme park together and utilizing the process of FIG. 6A. In FIG. 6B, a grandson and grandfather visit a theme park including a castle together in the year 2010 (highlighted illustration 698) and, upon the existence of a display condition, view the grandfather's recording summaries of when the grandfather visited the theme park in the years 1955 (highlighted illustration 696) and 1985 (highlighted illustration 694).

FIG. 7 depicts one embodiment of a summarizing filter 622 and a recording summary index (or index of recording summaries) 672. Summarizing filter 622 includes a first set of requirements 624 and a second set of requirements 626. The first set of requirements 624 determines when a life recording summary will be generated and stored on a computing device associated with the term "<My remote storage>." The second set of requirements 626 determines when a life recording summary will be generated and stored on a computing device associated with the term "<Cloud storage location>."

Both the first set of requirements 624 and the second set of requirements 626 include fields for location, time, event, and situation. These fields are similar to those used by pushing filter 602 in FIG. 4C. When all the fields in a set of requirements are satisfied, then the set of requirements is deemed to be satisfied. The location field corresponds with the geographical location for the life recording. The location field for first set of requirements 624 is assigned to a GPS location associated with the term "<My home>." The time field corresponds to the time of the life recording. The time field for the both the first set of requirements 624 and second set of requirements 626 may be satisfied anytime. The event field corresponds with calendar information associated with a user of the life recorder. The event field for the second set of requirements 626 may only be satisfied if calendar information associated with the user of the life recorder specifies that the user is "Meeting with Bill." The situation field corresponds with a particular situation that must be recognized or detected before automatically summarizing a life recording. The situation field for the first set of requirements 624 may only be satisfied if the object <My keys> is recognized.

Recording summary index 672 includes index entry 674 and index entry 676. Both index entry 674 and index entry 676 include searchable fields for location, time, event, and situation. These fields are similar to those used in pushing filter 602 in FIG. 4C. During a search of one or more index entries, if one or more fields in an index entry are satisfied, then that index entry may be deemed to be satisfied. Each index entry in a recording summary index may also be searched or queried based on one or more search criteria. Once an index entry has been satisfied, then a recording summary may be found or downloaded from the computing device assigned to the "link to summary" field. The "link to summary" field for index entry 676 is assigned "<Cloud storage location>," and therefore the corresponding recording summary for index entry 676 may be downloaded from the computing device associated with the term "<Cloud storage location>."

Figure 8:
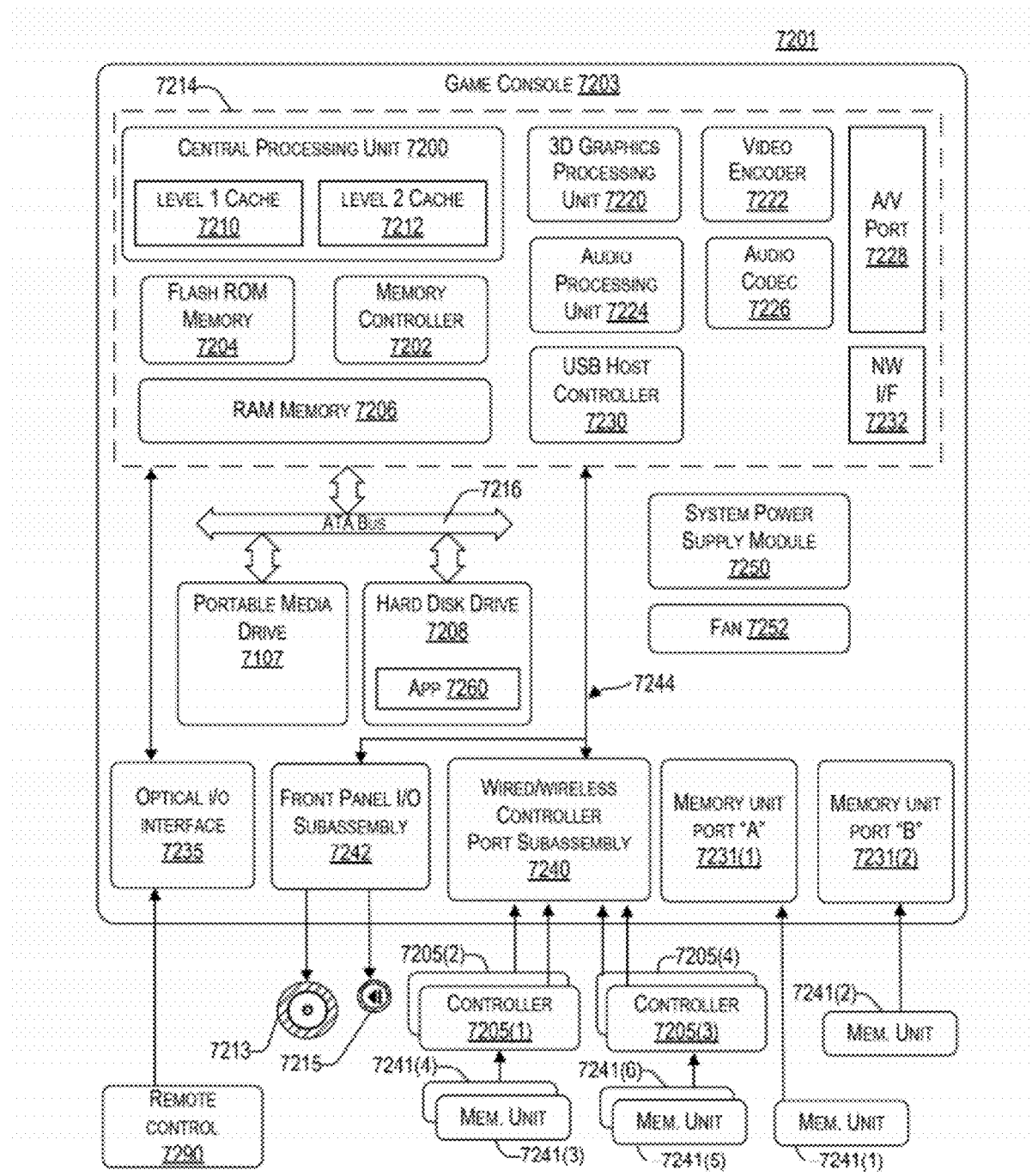
FIG. 8 is a block diagram of an embodiment of a gaming and media system.
Figure 9:
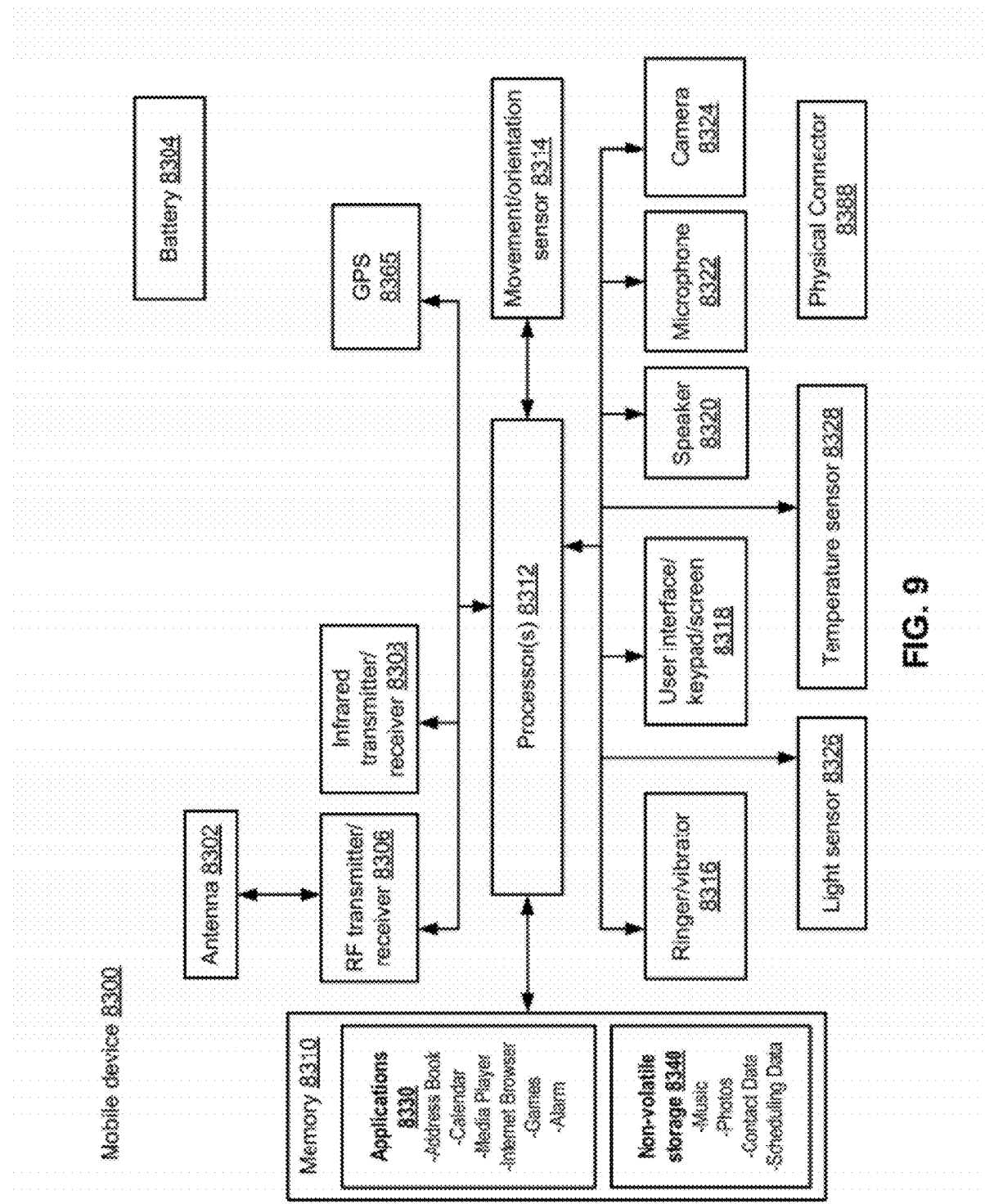
FIG. 9 is a block diagram of an embodiment of a mobile device.
Figure 10:
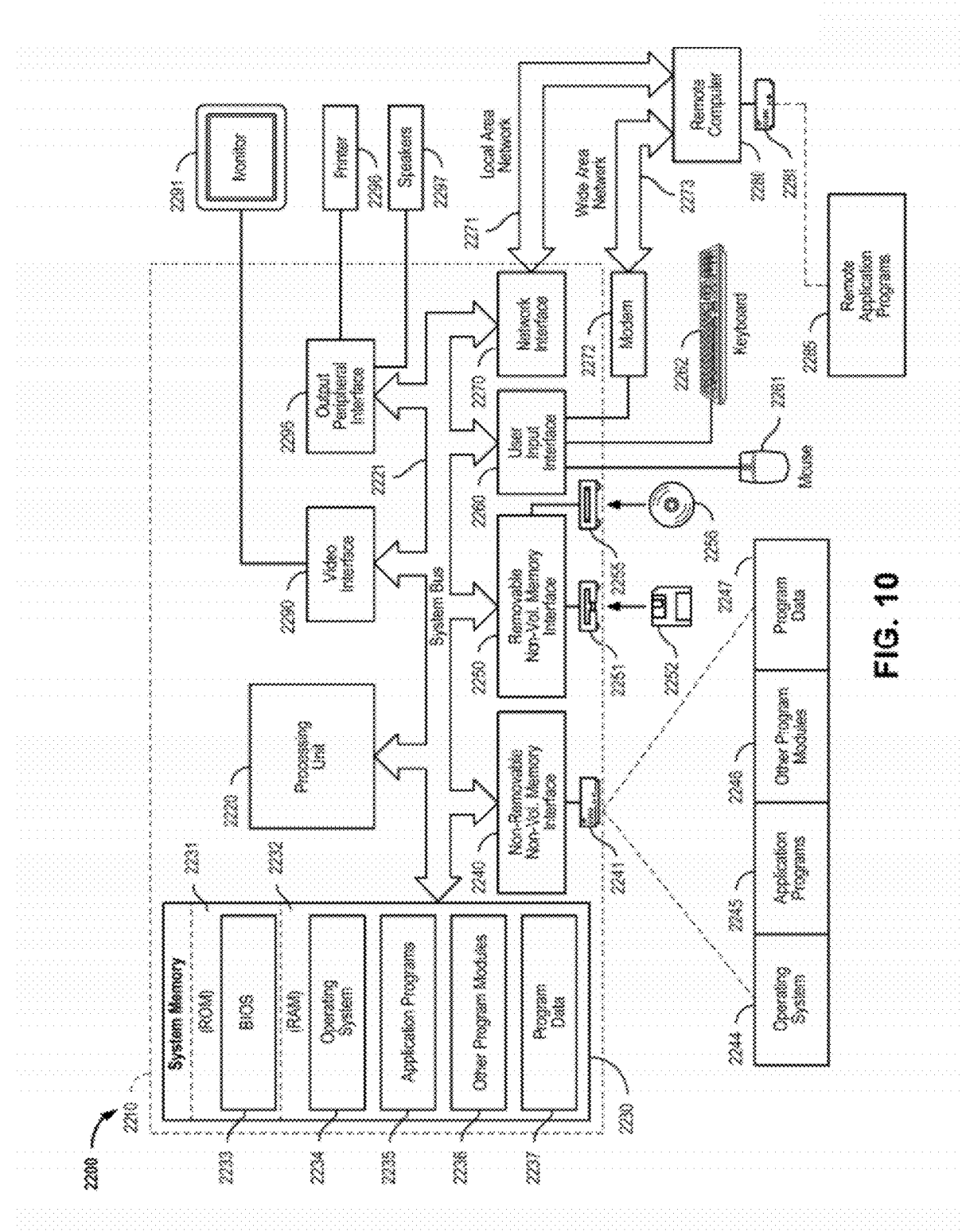
FIG. 10 is a block diagram of an embodiment of a computing system environment.

The disclosed technology may be used with various computing systems. FIGS. 8-10 provide examples of various computing systems that can be used to implement embodiments of the disclosed technology.

FIG. 8 is a block diagram of an embodiment of a gaming and media system 7201. Console 7203 has a central processing unit (CPU) 7200, and a memory controller 7202 that facilitates processor access to various types of memory, including a flash Read Only Memory (ROM) 7204, a Random Access Memory (RAM) 7206, a hard disk drive 7208, and portable media drive 7107. In one implementation, CPU 7200 includes a level 1 cache 7210 and a level 2 cache 7212, to temporarily store data and hence reduce the number of memory access cycles made to the hard drive 7208, thereby improving processing speed and throughput.

CPU 7200, memory controller 7202, and various memory devices are interconnected via one or more buses (not shown). The one or more buses might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus.

In one implementation, CPU 7200, memory controller 7202, ROM 7204, and RAM 7206 are integrated onto a common module 7214. In this implementation, ROM 7204 is configured as a flash ROM that is connected to memory controller 7202 via a PCI bus and a ROM bus (neither of which are shown). RAM 7206 is configured as multiple Double Data Rate Synchronous Dynamic RAM (DDR SDRAM) modules that are independently controlled by memory controller 7202 via separate buses (not shown). Hard disk drive 7208 and portable media drive 7107 are shown connected to the memory controller 7202 via the PCI bus and an AT Attachment (ATA) bus 7216. However, in other implementations, dedicated data bus structures of different types may also be applied in the alternative.

A three-dimensional graphics processing unit 7220 and a video encoder 7222 form a video processing pipeline for high speed and high resolution (e.g., High Definition) graphics processing. Data are carried from graphics processing unit 7220 to video encoder 7222 via a digital video bus (not shown). An audio processing unit 7224 and an audio codec (coder/decoder) 7226 form a corresponding audio processing pipeline for multi-channel audio processing of various digital audio formats. Audio data are carried between audio processing unit 7224 and audio codec 7226 via a communication link (not shown). The video and audio processing pipelines output data to an NV (audio/video) port 7228 for transmission to a television or other display. In the illustrated implementation, video and audio processing components 7220-7228 are mounted on module 7214.

FIG. 8 shows module 7214 including a USB host controller 7230 and a network interface 7232. USB host controller 7230 is in communication with CPU 7200 and memory controller 7202 via a bus (not shown) and serves as host for peripheral controllers 7205(1)-7205(4). Network interface 7232 provides access to a network (e.g., Internet, home network, etc.) and may be any of a wide variety of various wire or wireless interface components including an Ethernet card, a modem, a wireless access card, a Bluetooth® module, a cable modem, and the like.

In the implementation depicted in FIG. 8, console 7203 includes a controller support subassembly 7240 for supporting four controllers 7205(1)-7205(4). The controller support subassembly 7240 includes any hardware and software components needed to support wired and wireless operation with an external control device, such as for example, a media and game controller. A front panel I/O subassembly 7242 supports the multiple functionalities of power button 7213, the eject button 7215, as well as any LEDs (light emitting diodes) or other indicators exposed on the outer surface of console 7203. Subassemblies 7240 and 7242 are in communication with module 7214 via one or more cable assemblies 7244. In other implementations, console 7203 can include additional controller subassemblies. The illustrated implementation also shows an optical I/O interface 7235 that is configured to send and receive signals (e.g., from remote control 7290) that can be communicated to module 7214.

MUs 7241(1) and 7241(2) are illustrated as being connectable to MU ports "A" 7231(1) and "B" 7231(2) respectively. Additional MUs (e.g., MUs 7241(3)-7241(6)) are illustrated as being connectable to controllers 7205(1) and 7205(3), i.e., two MUs for each controller. Controllers 7205(2) and 7205(4) can also be configured to receive MUs (not shown). Each MU 7241 offers additional storage on which games, game parameters, and other data may be stored. Additional memory devices, such as portable USB devices, can be used in place of the MUs. In some implementations, the other data can include any of a digital game component, an executable gaming application, an instruction set for expanding a gaming application, and a media file. When inserted into console 7203 or a controller, MU 7241 can be accessed by memory controller 7202. A system power supply module 7250 provides power to the components of gaming system 7201. A fan 7252 cools the circuitry within console 7203.

An application 7260 comprising machine instructions is stored on hard disk drive 7208. When console 7203 is powered on, various portions of application 7260 are loaded into RAM 7206, and/or caches 7210 and 7212, for execution on CPU 7200. Other applications may also be stored on hard disk drive 7208 for execution on CPU 7200.

Gaming and media system 7201 may be operated as a standalone system by simply connecting the system to a monitor, a television, a video projector, or other display device. In this standalone mode, gaming and media system 7201 enables one or more players to play games or enjoy digital media (e.g., by watching movies or listening to music). However, with the integration of broadband connectivity made available through network interface 7232, gaming and media system 7201 may further be operated as a participant in a larger network gaming community.

FIG. 9 is a block diagram of one embodiment of a mobile device 8300. Mobile devices may include laptop computers, pocket computers, mobile phones, personal digital assistants, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

FIG. 10 is a block diagram of an embodiment of a computing system environment 2200. Computing system environment 2200 includes a general purpose computing device in the form of a computer 2210. Components of computer 2210 may include, but are not limited to, a processing unit 2220, a system memory 2230, and a system bus 2221 that couples various system components including the system memory 2230 to the processing unit 2220. The system bus 2221 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 2210 typically includes a variety of computer readable media. Computer readable media can be any available media that can be accessed by computer 2210 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2210. Combinations of the any of the above should also be included within the scope of computer readable media.

The system memory 2230 includes computer storage media in the form of volatile and/or nonvolatile memory such as read only memory (ROM) 2231 and random access memory (RAM) 2232. A basic input/output system 2233 (BIOS), containing the basic routines that help to transfer information between elements within computer 2210, such as during start-up, is typically stored in ROM 2231. RAM 2232 typically contains data and/or program modules that are immediately accessible to and/or presently being operated on by processing unit 2220. By way of example, and not limitation, FIG. 10 illustrates operating system 2234, application programs 2235, other program modules 2236, and program data 2237.

The computer 2210 may also include other removable/non-removable, volatile/nonvolatile computer storage media. By way of example only, FIG. 10 illustrates a hard disk drive 2241 that reads from or writes to non-removable, nonvolatile magnetic media, a magnetic disk drive 2251 that reads from or writes to a removable, nonvolatile magnetic disk 2252, and an optical disk drive 2255 that reads from or writes to a removable, nonvolatile optical disk 2256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2241 is typically connected to the system bus 2221 through an non-removable memory interface such as interface 2240, and magnetic disk drive 2251 and optical disk drive 2255 are typically connected to the system bus 2221 by a removable memory interface, such as interface 2250.

The drives and their associated computer storage media discussed above and illustrated in FIG. 10, provide storage of computer readable instructions, data structures, program modules and other data for the computer 2210. In FIG. 10, for example, hard disk drive 2241 is illustrated as storing operating system 2244, application programs 2245, other program modules 2246, and program data 2247. Note that these components can either be the same as or different from operating system 2234, application programs 2235, other program modules 2236, and program data 2237. Operating system 2244, application programs 2245, other program modules 2246, and program data 2247 are given different numbers here to illustrate that, at a minimum, they are different copies. A user may enter commands and information into computer 2210 through input devices such as a keyboard 2262 and pointing device 2261, commonly referred to as a mouse, trackball, or touch pad. Other input devices (not shown) may include a microphone, joystick, game pad, satellite dish, scanner, or the like. These and other input devices are often connected to the processing unit 2220 through a user input interface 2260 that is coupled to the system bus, but may be connected by other interface and bus structures, such as a parallel port, game port or a universal serial bus (USB). A monitor 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 may operate in a networked environment using logical connections to one or more remote computers, such as a remote computer 2280. The remote computer 2280 may be a personal computer, a server, a router, a network PC, a peer device or other common network node, and typically includes many or all of the elements described above relative to the computer 2210, although only a memory storage device 2281 has been illustrated in FIG. 10. The logical connections depicted in FIG. 10 include a local area network (LAN) 2271 and a wide area network (WAN) 2273, but may also include other networks. Such networking environments are commonplace in offices, enterprise-wide computer networks, intranets and the Internet.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the Internet. The modem 2272, which may be internal or external, may be connected to the system bus 2221 via the user input interface 2260, or other appropriate mechanism. In a networked environment, program modules depicted relative to the computer 2210, or portions thereof, may be stored in the remote memory storage device. By way of example, and not limitation, FIG. 10 illustrates remote application programs 2285 as residing on memory device 2281. It will be appreciated that the network connections shown are exemplary and other means of establishing a communications link between the computers may be used.

The disclosed technology is operational with numerous other general purpose or special purpose computing system environments or configurations. Examples of well-known computing systems, environments, and/or configurations that may be suitable for use with the technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for transmitting data, comprising:
   acquiring a first portion of a life recording as the life recording is being recorded on a life recorder, the acquiring is performed by the life recorder;
   generating context information associated with the first portion, the context information includes location information associated with a location of the life recorder when the life recorder recorded the first portion;
   identifying a person from the first portion, the identifying a person from the first portion is performed by the life recorder, the identifying includes determining an identification of the person based on the first portion of the life recording, the identifying a person from the first portion is performed using at least one of a voice recognition technique or a facial recognition technique on the first portion;
   detecting a push condition, the detecting a push condition includes automatically comparing the identification of the person with one or more requirements for determining when to transfer data from the life recorder to a target device, the detecting a push condition includes automatically comparing the context information with the one or more requirements, the detecting a push condition includes detecting that the one or more requirements are satisfied by the context information and the identification of the person; and
   automatically transmitting a second portion of associated with the life recording different from the first portion of the life recording to the target device, the automatically transmitting is performed in response to detecting the push condition, the automatically transmitting includes transmitting the life recording as a live feed to the target device,
   wherein the first portion of the life recording corresponds with a first time period, the second portion of the life recording corresponds with a second time period subsequent to the first time period.

2. The method of claim 1, wherein:
   the life recording is one of a video recording, an audio recording, or an audiovisual recording.

3. The method of claim 1, wherein: the location information includes a GPS location.

4. The method of claim 1, wherein:
   the generating context information includes acquiring calendar information associated with a user of the life recorder; and
   the context information includes a description of a calendar event associated with the user of the life recorder, the calendar event associated with a particular time at which the acquiring a first portion of a life recording is performed.

5. The method of claim 1, wherein:
   the detecting a push condition includes determining whether the target device has subscribed to receive the life recording.

6. The method of claim 1, wherein:
   the detecting a push condition includes determining whether a receiving filter associated with the target device is satisfied by the context information and the identification of the person.

7. The method of claim 1, wherein:
   the life recorder is a mobile device associated with a first user; and
   the target device is a mobile device associated with a second user different from the first user.

8. An electronic device for transmitting data, comprising:
a digital video camera, the digital video camera captures a live feed; and
one or more processors, the one or more processors in communication with the digital video camera, the one or more processors receive one or more requirements for pushing the live feed to a target device, the one or more processors generate context information associated with a first portion of the live feed, the context information includes location information associated with a location of the electronic device when the first portion of the live feed was recorded, the one or more processors identify a person from the first portion of the live feed and determine an identification of the person, the identifying a person from the first portion is performed using at least one of a voice recognition technique or a facial recognition technique on the first portion, the one or more processors determine whether the one or more requirements are satisfied based on the context information and the identification of the person, the one or more processors determine whether a receiving filter associated with the target device is satisfied based on the context information and the identification of the person, the one or more processors transmit at least the a second portion of the live feed different from the first portion of the live feed to the target device in response to determining that the one or more requirements and the receiving filter are satisfied,
wherein the first portion of the live feed corresponds with a first time period, the second portion of the live feed corresponds with a second time period subsequent to the first time period.

9. The electronic device of claim 8, wherein:
the one or more processors identify the person using facial recognition.

10. The electronic device of claim 8, wherein:
the electronic device is a mobile device associated with a first user; and
the target device is a mobile device associated with a second user different from the first user.

11. The electronic device of claim 9, wherein: the location information includes a GPS location.

\* \* \* \* \*